June 25, 1929.  C. A. FAUSEL ET AL  1,718,341
INDICATOR
Filed Nov. 6, 1923  10 Sheets-Sheet 1
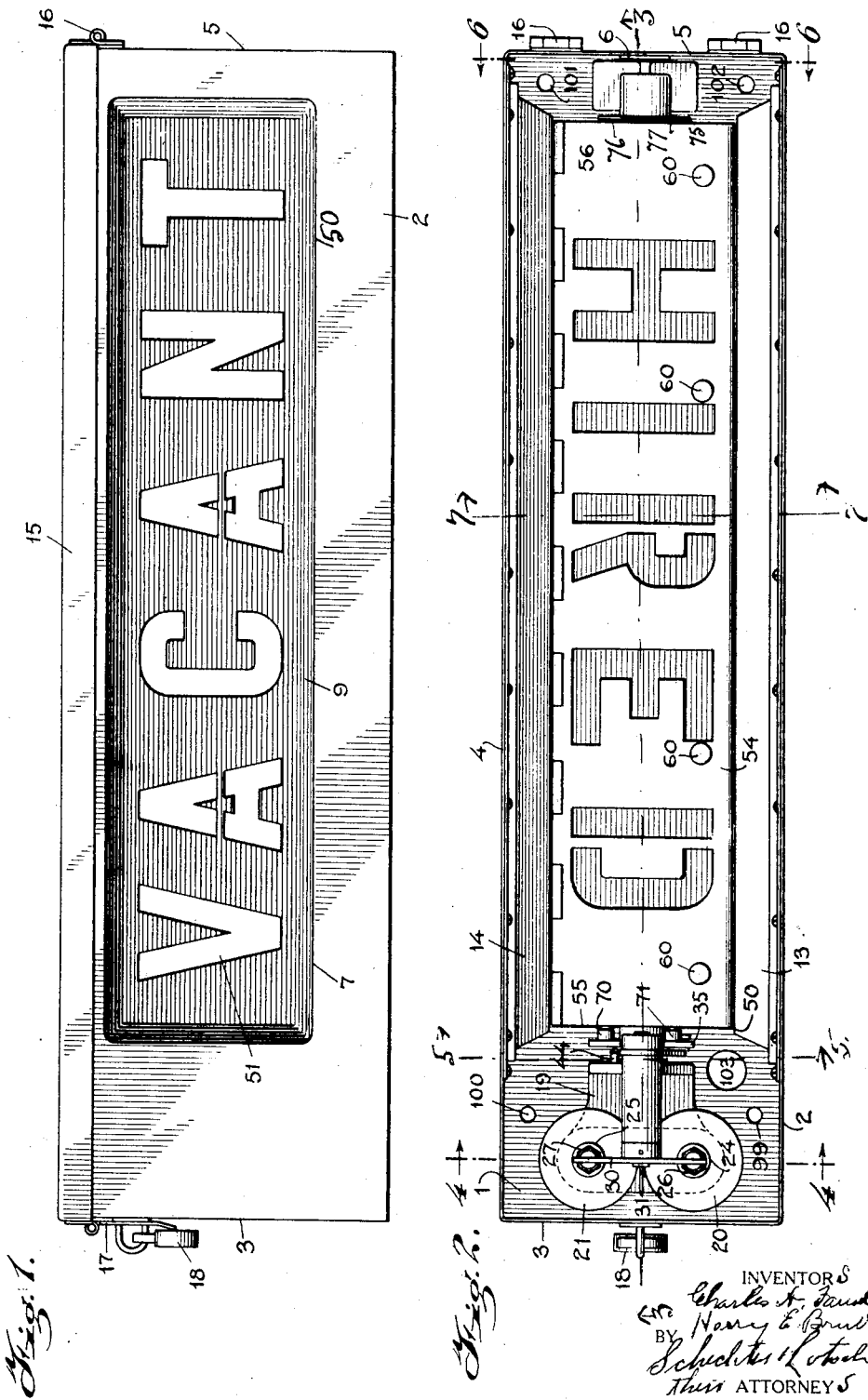

June 25, 1929.  C. A. FAUSEL ET AL  1,718,341
INDICATOR
Filed Nov. 6, 1923  10 Sheets-Sheet 2
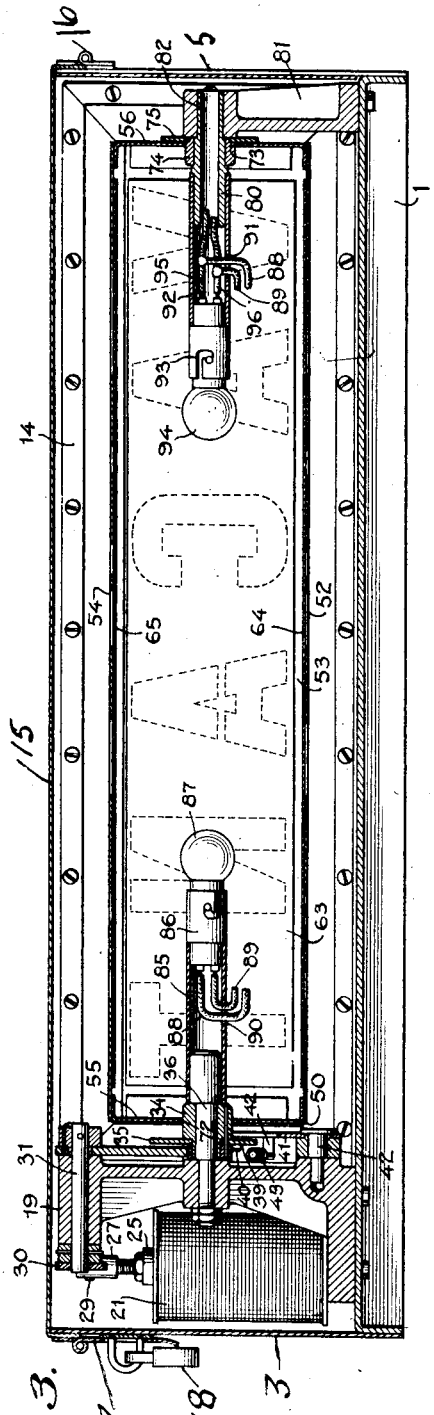
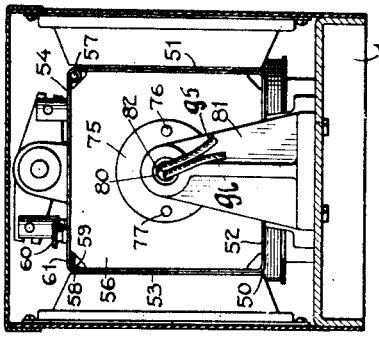
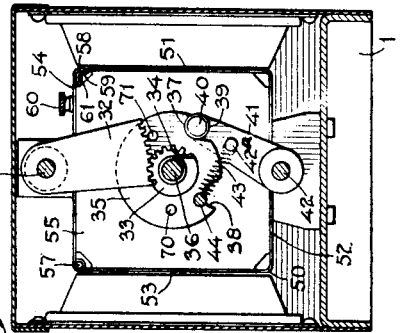
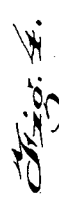
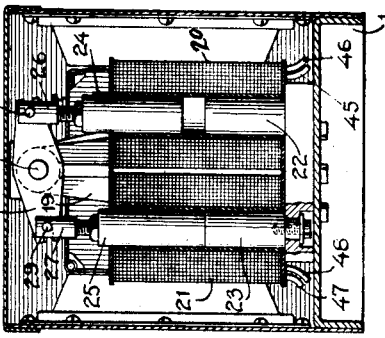

June 25, 1929.  C. A. FAUSEL ET AL  1,718,341
INDICATOR
Filed Nov. 6, 1923   10 Sheets-Sheet 3

INVENTORS
Charles A. Fausel
Harry E. Bauer
BY
Schechter Lotsch
their ATTORNEYS

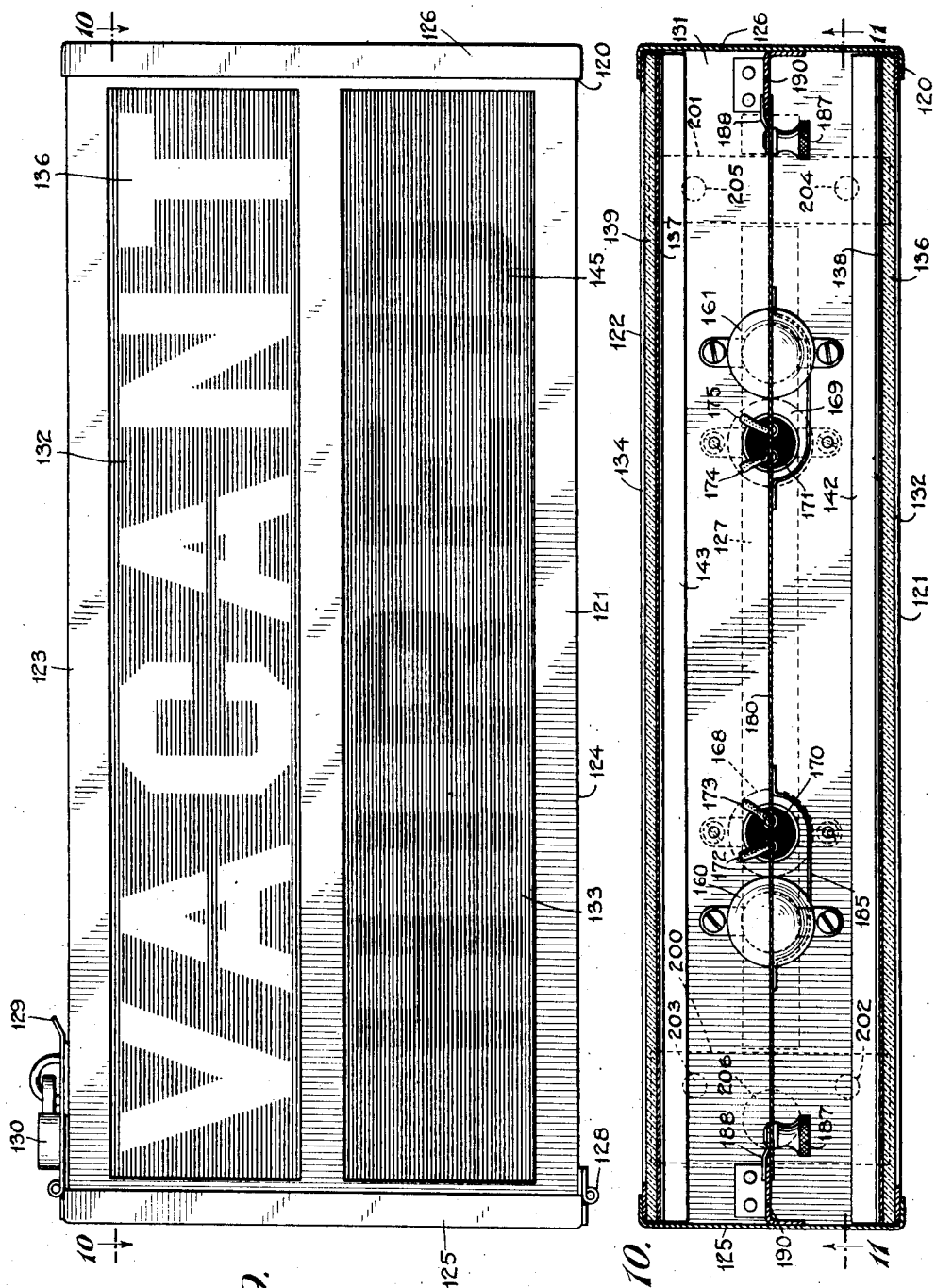

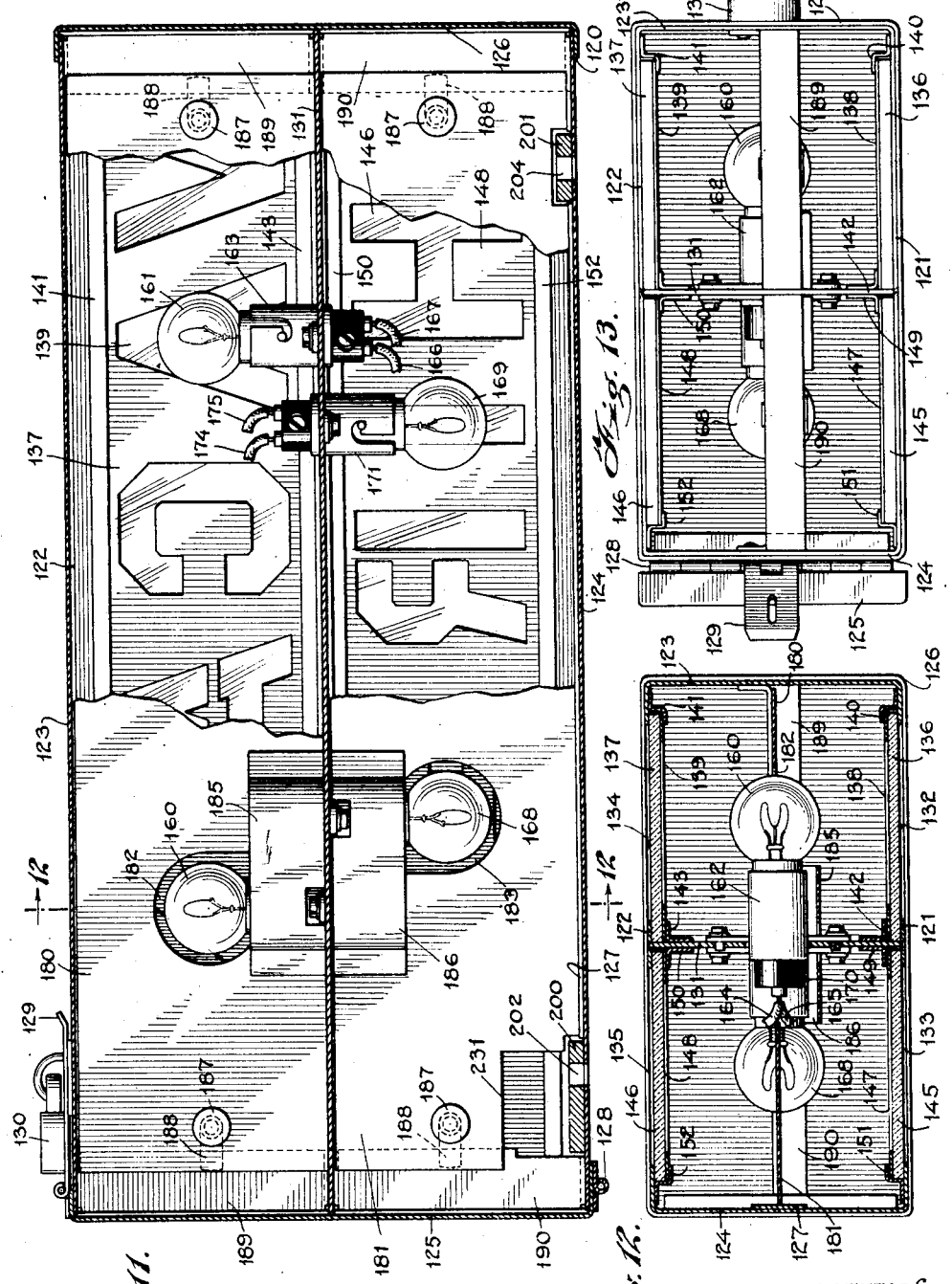

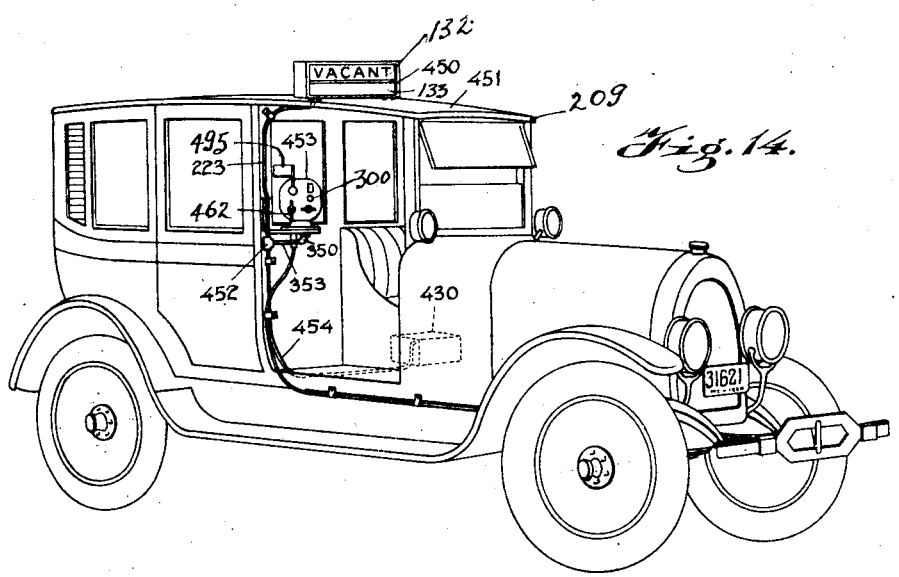
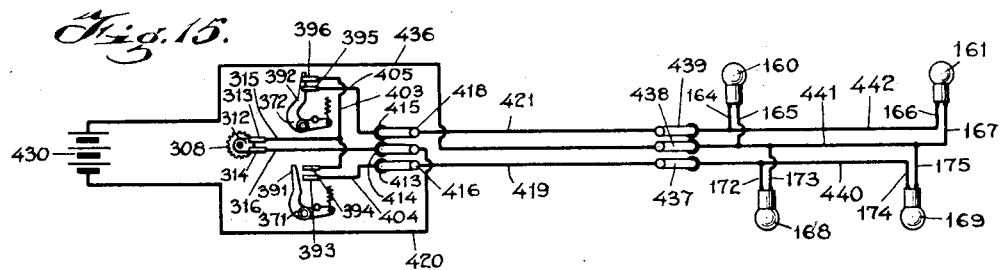
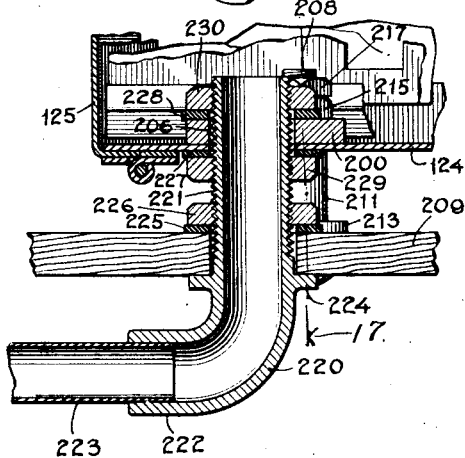
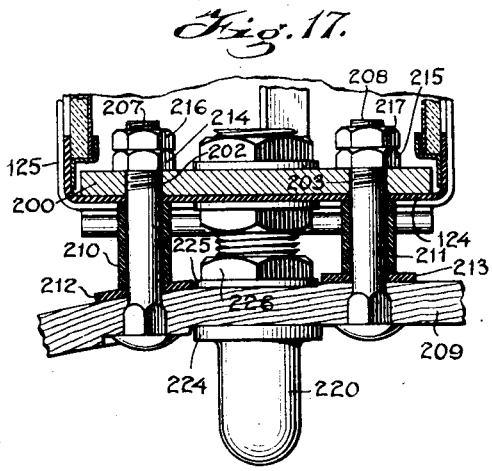

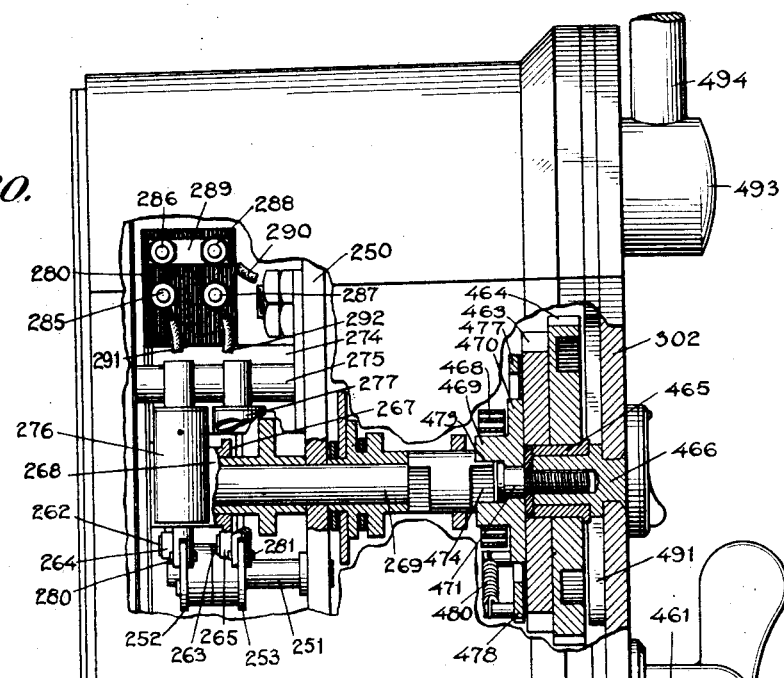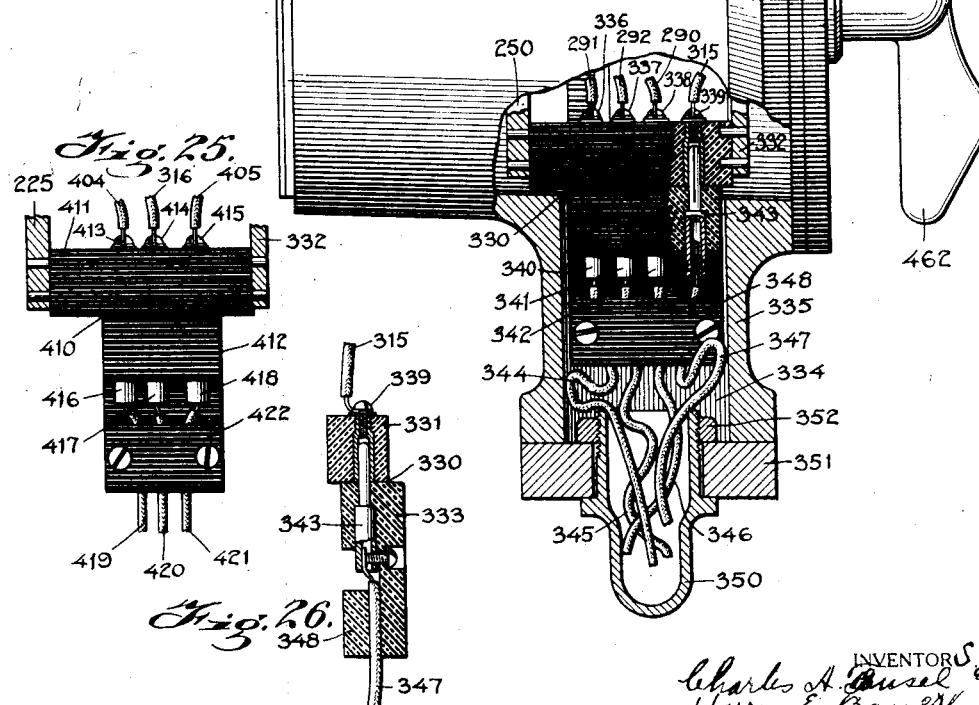

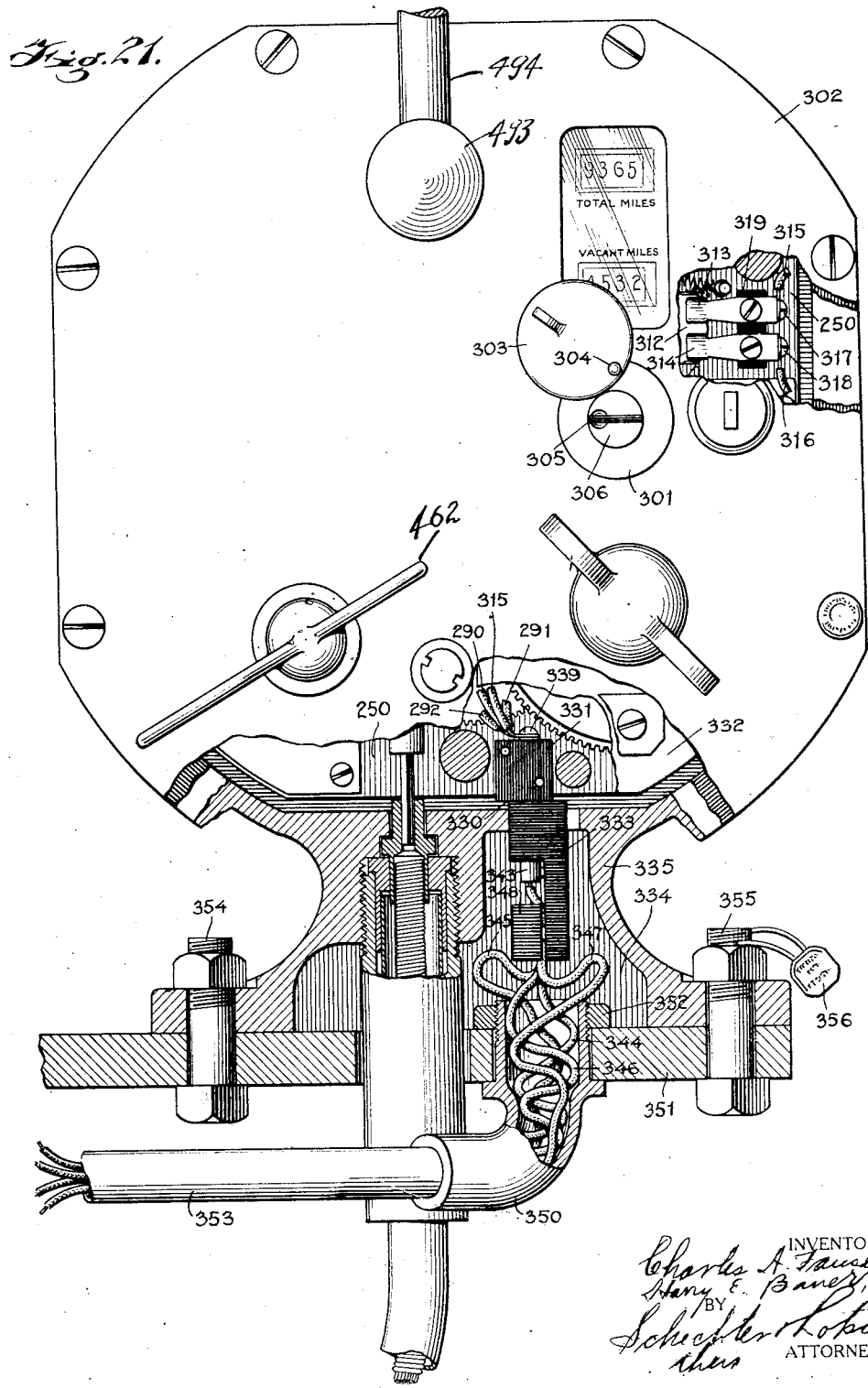

June 25, 1929.  C. A. FAUSEL ET AL  1,718,341
INDICATOR
Filed Nov. 6, 1923   10 Sheets-Sheet 10
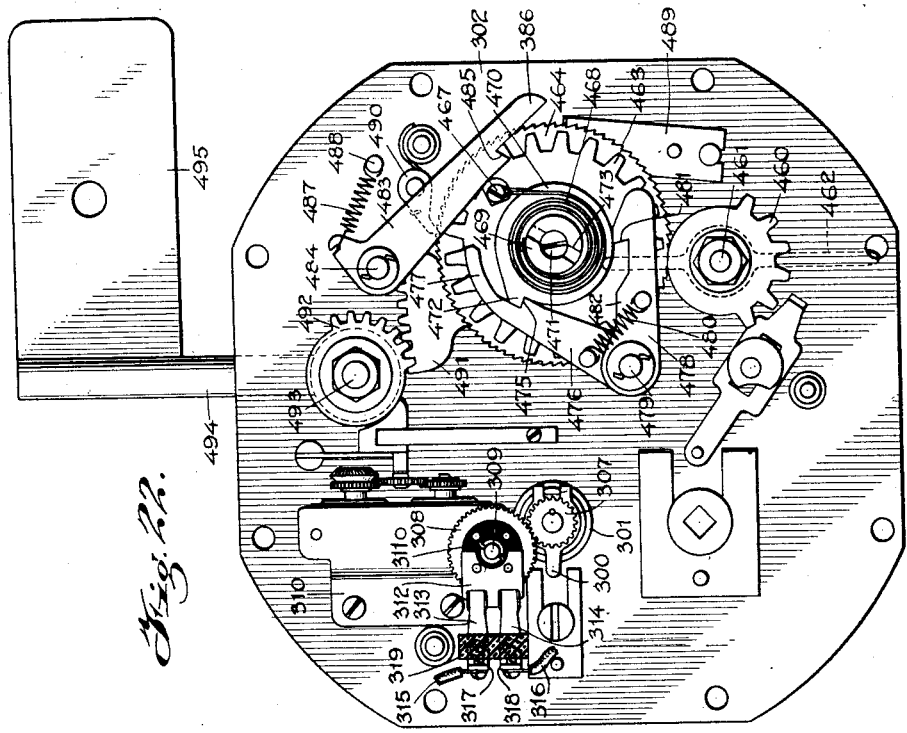
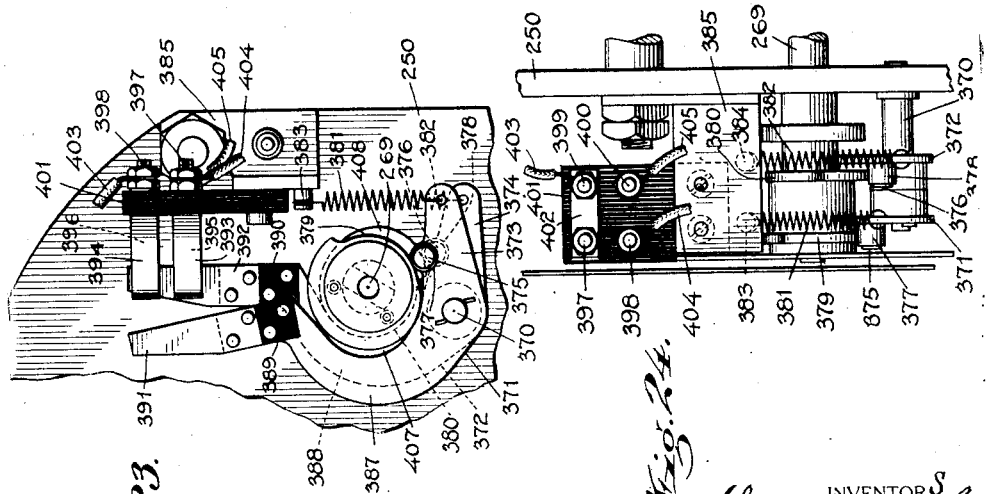

Patented June 25, 1929.

1,718,341

UNITED STATES PATENT OFFICE.

CHARLES A. FAUSEL, OF GLEN RIDGE, NEW JERSEY, AND HARRY E. BAUER, OF NEW YORK, N. Y., ASSIGNORS TO INTERNATIONAL TAXAMETER CORPORATION, A CORPORATION OF NEW YORK.

INDICATOR.

Application filed November 6, 1923. Serial No. 673,065.

Our invention relates to improvements in indicators, either singly or in association or combination with a fare registering device, commonly called a "taximeter", and particularly to such devices as are used upon public conveyances, such as taxicabs, for the purpose of distinctly, plainly and visually indicating whether the conveyance is "hired" or "vacant."

The invention is adapted for use with a fare register of the class disclosed in our copending application filed September 24, 1923, Ser. No. 664,361, and that disclosed in the patents to Alonzo G. Decker, No. 1,058,222, dated April 8, 1913, and No. 1,013,279, dated January 2, 1912, upon which our improvements are predicated. In this application we have described and disclosed only such parts of the mechanism of said application and patents as are essential to a proper understanding of our invention, reference being made to said application and patents for a full and complete understanding of the mechanism which is not covered by our improvement as herein described.

Owing to the great difficulty experienced by the public in ascertaining whether a taxicab is hired or vacant, especially in the congested traffic conditions in the shopping districts in the daytime, and more especially at night, and again during the rainy seasons both day and night, the inconvenience and danger to the public in walking on the driveway trying to get a vacant taxicab, it became necessary to devise means of apprising the public as to whether a taxicab is vacant or hired without leaving the sidewalk or shelter in bad weather.

It is one of the objects of our invention to provide an indicator, placed in a conspicuous position on the roof of the vehicle, so that it will be readily visible and plainly indicated whether the taxicab is "hired" or "vacant", the indicator being seen from a considerable distance.

Another object of our invention is the construction of an indicator which will be automatic and positive in operation and out of the control of the driver.

Another object of our invention is to provide an indicator in combination with a fare registering device and means for simultaneously operating said fare registering device and indicator.

Another object of our invention is to provide means, automatic in operation at a predetermined point, to take the control of the device out of the hands of the driver.

The operation of taxicabs and the tariff to be charged by such vehicles are now universally regulated by ordinances which vary in extent and condition in various localities, but all such regulations require that the taxicab operator shall indicate whether the vehicle is "hired" or "vacant". A further important feature and advantage of our invention resides in the fact that with the indicator in a prominent position on the top of the taxicab, it is readily and easily seen by the police and the inspectors of the operating company owning the cabs, and they will be thus informed as to whether the taxicab is "hired" or "vacant".

With these and other objects in view to be more fully set forth hereinafter, the invention consists in the novel construction, combination of elements, and arrangement of parts for a device of the character described by means which will be exemplified in the operation and construction herein described in the following specification and illustrated in the accompanying drawings, considered together or separately.

In the drawings,—

Fig. 1 is a front elevation of the rotary indicator, embodying our invention.

Fig. 2 is a plan view of the rotary indicator with the cover removed.

Fig. 3 is a sectional elevation taken on the line 3—3 of Fig. 2.

Fig. 4 is a sectional view taken on the line 4—4 of Fig. 2 showing a portion of the indicator actuating mechanism.

Fig. 5 is a sectional view on the line 5—5 of Fig. 2 showing other portions of the indicator actuating mechanism.

Fig. 6 is a sectional view on the line 6—6 of Fig. 2 showing a right elevation of the interior of the indicator.

Fig. 9 is a front elevation of a modified form of indicator embodying our invention.

Fig. 10 is a sectional view taken on the line 10—10 of Fig. 9.

Fig. 11 is a sectional view taken on the line 11—11 of Fig. 10.

Fig. 12 is a sectional view taken on the line 12—12 of Fig. 11.

Fig. 13 is a left elevation of Fig. 9 with the cover open.

Fig. 14 is a view showing the installation of an indicator on a taxicab and the connection of the same to the taximeter and electrical energizing source.

Fig. 15 is a wiring diagram of lights of the modified form of indicator and means for energizing and controlling the same.

Fig. 16 is a detail sectional view showing means for leading wires to the indicators and for securing the indicator to the taxicab.

Fig. 17 is a detail sectional view showing the wire leading and the securing means of Fig. 16 on the line 17—17 of Fig. 16.

Fig. 20 is a right elevation of the taximeter mounted on a bracket with portions of the case broken away and in section to show the connection between the automatic control and the magnet control mechanism and to show the means of connecting the circuit of the taximeter to an outside source with a plug switch.

Fig. 21 is a rear elevation of the taximeter mounted on a bracket with portions of the case broken away and in section to show the key switch and means of connecting the circuit of the taximeter to an outside source.

Fig. 22 is an interior view of the back plate of the taximeter showing the automatic control and the key switch mechanism.

Fig. 23 is a detail fragmental view showing the mechanism for controlling the circuit of the lights in the modified form of indicator.

Fig. 24 is a detail view showing the mechanism of Fig. 23 looking at it from the right.

Fig. 25 is a detail view showing the plug switch for the modified form of indicator.

Fig. 26 is a detail sectional view of the plug switches shown in Figs. 20 and 25.

*Description and operation of the rotary indicator.*

Figure 7:
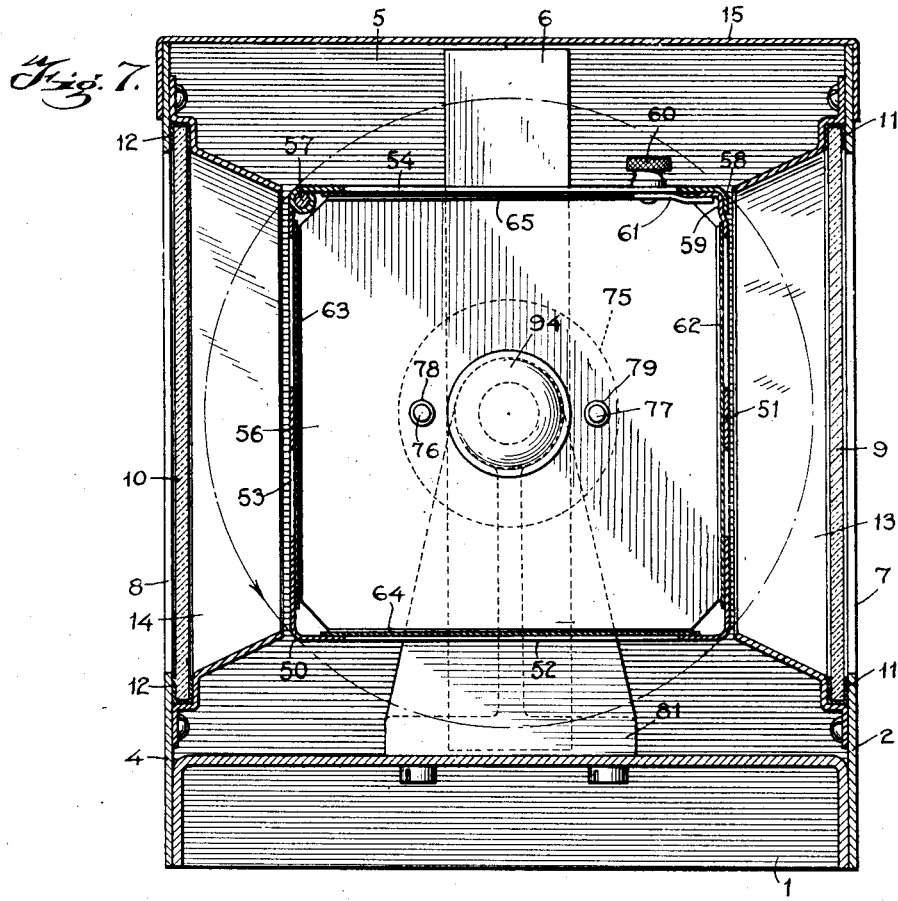
Fig. 7 is a sectional view on the line 7—7 of Fig. 2.

Affixed to the base 1, Figs. 2, 3 and 7, are the sides 2, 3, 4 and 5 which are bent up from one piece to form the shape shown, the ends of said piece being firmly held together at the side 5 by a strip 6. The sides 2 and 4 have therein openings 7 and 8 (Figs. 1 and 7), which are covered with the clear glass plates 9 and 10, said glass plates having on all their edges U-shaped strips of waterproof material 11 and 12. The glass plates 9 and 10 are held in position by the frames 13 and 14 which are affixed to the sides 2 and 4 respectively, thereby securely holding the waterproof strips 11 and 12 and hence the glass plates 9 and 10 in place. A cover 15 is secured at the side 5, Figs. 1, 2, 3 and 7, by the hinges 16, 16, and at the side 3 by a clasp 17 and padlock 18, said padlock being locked in position with a key which is in the possession of the owner of the car. It can be seen that the container made up of the base 1, the sides 2, 3, 4 and 5, and the cover 15 and glass plates 9 and 10, will be tamperproof and waterproof and will protect from the elements or molestation any mechanism or parts that might be placed therein.

A bracket 19 is affixed to the base 1, Figs. 2, 3, 4, and has mounted thereon the magnets 20 and 21 in the spools of which are secured the cores 22, 23. Leading from the magnet 20 are the feed wires 45, 46, and from the magnet 21 the feed wires 47, 48. The wires 45, 46 and the wires 47, 48 energize their corresponding magnet when an electric current is passed through them at the proper time. The magnet plungers 24, 25 slide in the spools of the magnets and are secured to the adjustable connections 26, 27 which, in turn, are held by the pin and slot combinations 28, 29 to the rocker arm 30. The rocker arm 30 is fixed on one end of a shaft 31 which is journaled in the bracket 19. To the other end of the shaft 31 is secured a gear segment 32, Fig. 5, which meshes with a mutilated gear 33 affixed on a hub 34. Hub 34 has affixed thereon a notched disk 35 and is pivotally mounted on a stud 36 secured to the bracket 19. The disk 35 has two notches 37, 38 which are one-quarter of a revolution apart and which engage at the proper time with a roller 39 mounted on a stud 40 fixed to one end of a lever 41. A stud 42 is secured to the bracket 19 and has mounted on it the lever 41. A spring pin 42$^a$ is affixed to the lever 41 and carries one end of a spring 43, the other end of which is held by a pin 44 secured to the bracket 19. The spring 43 holds the roller 39 of the lever 41 against the periphery of the disk 35. Thus, when the roller 39 is in engagement with one of the notches 37 or 38, it prevents accidental rotation of the disk 35.

The operation of the mechanism so far described is as follows: When the magnet 20 is energized by an electric current passing through the wires 45, 46, it attracts the plunger 24 which in turn rocks the lever 30 in a clockwise direction (Figs. 4, 5). This motion is transmitted to the gear segment 32 which turns the mutilated gear 33 in a counter-clockwise direction one-quarter of a revolution. The notched disk 35 turns with the mutilated gear 33 and in so doing cams the roller 39 out of the notch 37. When the notched disk 35 nears the end of its one-quarter revolution, the roller 39 is forced into the notch 38 by the spring 43 and this spring retracts the notched disk 35 in the position in which it is finally placed. When the plunger 24 descends, the plunger 25 ascends due to the action of the rocker arm 30 and in so doing places the plunger 25 in a position to actuate the mechanism when the magnet 21 is energized. When the plunger 25 is attracted by the magnet 21 it turns the notched disk 35 in a clockwise direction one-quarter of a revolution, thus again putting it in the position as shown in Fig. 5, where it is retained by the roller 39.

A rectangular box-like member 50 (Figs. 1, 2, 3, 5, 6, 7) has sides 51, 52, 53 and 54 and the ends 55 and 56. The edges of the ends 55, 56 are bent and are fixed to the sides 51, 52, 53. The side 54 is hinged on one of its edges to an edge of the side 51 and swings on a pin 57. The other edge of the side 54 has a bent portion 58 which encompasses the bent edge 59 of the side 53. To hold the side 54 in the position shown, the knobs 60 are rotatably mounted in said side and have affixed thereto the bent members 61 which engage with the bent portion 59 of the side 53. If it is desired to swing the side 54 on its pin 57 to gain access to the interior of the box 50, the knobs 60 are turned, thus disengaging the bent members 61 from the bent portion 59 and so allowing the side 54 to be swung upwardly. The sides 51 and 53 have cut in them the word "Vacant" and the sides 52 and 54 the word "Hired." Mounted on the sides 51, 53, in back of the word "Vacant," are the sheets of colored translucent material 62, 63 (Figs. 3, 7), and mounted on the sides 52, 54, in back of the word "Hired" are the sheets of a different colored translucent material 64, 65. With the sheets of translucent materials of different color, say green for "vacant" and red for "hired", it will enable persons, especially at night, when the indicator is illuminated, to ascertain whether the taxicab or conveyance is vacant or hired, at a great distance, where the indicator would be unreadable by distinguishing the different colors that might be presented. In the daytime the colors would be easily distinguishable and the words "Vacant" and "Hired" could be seen from a distance.

To the notched disk 35, Figs. 2, 3 and 5, are affixed the pins 70, 71 which protrude into corresponding holes in the end 55 of the box 50, thus causing the end 55 and hence the box 50 to rotate with the notched disk 35 when it is actuated. The end 55 has a hole 72 which fits over the hub 34, thus pivoting box 50. A hole 73 in the end 56 (Figs. 3, 6, 7) encompasses a hub 74 and also serves as a pivot for the box 50. To the hub 74 is secured a disk 75 upon which are affixed the pins 76, 77, said pins engaging with corresponding holes 78, 79 in the end 56. The hub 74 is rotatably mounted on a stud 80 which is fixed in a bracket 81 secured to the base 1. The stud 80 has a passageway 82 through which the wires feeding the illuminating means are led. It can be seen that when the box 50 is rotated the hub 74 will also rotate, due to the connection between the end 56, the pins 76, 77 and the disk 75, thus giving the box 50 a larger bearing surface than it would have if it turned with the hole 73 of the end 56 as a bearing and so lessening the wear. It can be seen that the holes in the end 55 through which the pins 70 and 71 protrude are not coincident with the holes 78, 79 in the end 56. Therefore it will be impossible to put the box 50 in the container so that the end 56 would be where the end 55 now is, and vice versa, because the holes 78, 79 will not register with the pins 70, 71, nor will the pins 76, 77 register with the holes through which the pins 70, 71 protrude. Also, it will be impossible when setting the box 50 in the container to place it in any position except as shown in Fig. 5, as the pins 70, 71 will not register with the corresponding holes in the end 55, except when the end 55 is in the position indicated.

To the stud 36, Fig. 3, is secured a tubular member 85 which has affixed thereto a socket 86 into which an electric bulb 87 is placed. Leading from the socket 86 are the wires 88, 89 which, when energized, illuminate the electric bulb 87. The wires 88, 89 are led through a hole 90 in the tubular member 85 and extend through the interior of the box 50 to a hole 91 in a tubular member 92 which is affixed to the stud 80. A socket 93 is fastened to the tubular member 92 and holds an electric bulb 94 which is energized by the wires 95, 96 and then are led through the passageway 82 in the stud 80 to the proper switching and energizing means. The bulbs 87 and 94 are thus connected in parallel so that when the wires 95, 96 are energized, both bulbs will be illuminated. Two bulbs are used so as to provide a better distribution of light; also to insure partial illumination of the indicator in case one of the bulbs should burn out.

In Fig. 2 there are shown in the base 1, the holes 99, 100, 101 and 102. These holes are used to retain the securing means which hold the indicator in position on a taximeter or other conveyance and will be described later. The base 1 is also provided with a hole 103 which secures one end of a means used for leading the wires from the indicator. These means will also be described later.

The operation of the indicator is as follows:

It will be assumed that the indicator is so mounted on the top of the taxicab or conveyance that it will appear as in Fig. 14 when viewed from the front of the vehicle and that it is controlled by a type of taximeter or fare indicator such as disclosed in our co-pending application, previously mentioned. It will be obvious that in the indicator mounted as aforementioned, the word "Vacant" will be visible through the glass in the side 2 to any one viewing said indicator from the front of the taxicab or conveyance and that the word "Vacant" will also be visible through the glass in the side 4 to persons viewing the vehicle from the rear. When the taxicab or conveyance is idle or waiting for passengers, the flag of the taximeter will be in a vertical position which will indicate that the vehicle is for hire or vacant, and the indicator on the roof of the vehicle will also show "Vacant", as shown in Fig. 14, thus making a more obvious presentation of the condition of the vehicle to interested persons. When a passenger hires the taxicab, the driver turns the wing nut 462 on the back of the taximeter and starts to lower the flag. When the flag reaches its midway or predetermined position, the automatic control mechanism comes into action and automatically takes the device out of the control of the driver, and sets the indicating and recording mechanism in the "hired" position, as described in our co-pending application heretofore mentioned, to which reference is made for a full and complete description of the operation thereof. At the same instant, a mechanism, also actuated by the automatic control, closes the circuit of the magnet 20, Figs. 4 and 5, thus vibrating the rocker arm 30, and hence rotating the notched disk 35 one-quarter of a revolution in a counter-clockwise direction which, in turn, through the pins 70, 71, imparts a like motion to the box 50, thereby moving the side 52 of said box in the position that was formerly occupied by the side 51 and moving the side 54 in the former position of the side 53. The word "Hired" will then appear in the indicator, thus informing those interested of the condition of the vehicle. When the driver sets the taximeter to the "cash" or temporary non-recording position to discharge a passenger, the indicator will still show "Hired", as the vehicle is engaged until the passenger has paid his fare and left the vehicle. After a passenger has paid his fare, the driver again turns the wing nut on the taximeter, thus raising the flag toward the "vacant" position. When the flag reaches the midway or predetermined position, the automatic control again comes into action, thus causing the indicating and recording mechanism of the taxicab to be set in the "vacant" position and also actuating a mechanism which closes the circuit of the magnet 21. The actuation of the magnet 21 rotates the box 50 one-quarter of a revolution in a clockwise direction, thus again causing the indicator to show the word "Vacant" and hence informing those concerned that the taxicab or conveyance is for hire. It is obvious from the foregoing description that the operation of the indicator from "Vacant" to "Hired" or vice versa is absolutely out of the control of the driver as the automatic control actuates the mechanism which governs the indicator, thereby making it impossible for the driver to set the indicator in a false position. The circuit of the lights 87 and 94 of the indicator is controlled by a key switch in the taximeter which will be hereinafter described. The key for this switch is held by the owner or operator of the taxicab who can, by turning the lock, cause the lights to be illuminated. This switch is installed so that it will not be necessary for the lights to remain illuminated during the daytime or while the vehicle is in the garage or storage. As the driver does not have a key for the key switch, it will be impossible for him to extinguish the lights at any time for any reason whatsoever.

*Description of the modified indicator.*

The casing 120, Figs. 9, 10, 11, 12, 13, consists of the sides 121 and 122, the top 123, the bottom 124 and the ends 125 and 126. The sides 121 and 122 and the top and bottom 123, 124 are formed from one piece, two edges of which are secured on the bottom 124 by a strip 127. The end 126 is fixed to the sides 121, 122, the top 123 and the bottom 124, and the end 125 is secured on the bottom 124 by a hinge 128 and on the top 123 by a clasp 129 and padlock 130. A partition 131 is fixed to the sides 121 and 122, dividing the casing 120 into two light-tight compartments. The side 121, Fig. 12, has the openings 132, 133, and the side 122 the openings 134, 135. In back of the openings 132, 134 are the colored glass pieces 136, 137, behind which are the stencils 138, 139, in which is cut the word "Vacant". The glass pieces 136 and 137 and the stencils 138 and 139 respectively slide in the guides 140 and 141, fixed to the sides 121 and 122 and the guides 142 and 143, fixed to the partition 131. To the rear of the openings 133 and 135 are the glass pieces 145 and 146 which are of a different color than the glass pieces 136 and 137 and behind which are the stencils 147 and 148 in which is cut the word "Hired". The glass pieces 145 and 146 and the stencils 147 and 148 respectively slide in the guides 149 and 150 fixed to the partition 131 and the guides 151 and 152 fixed to the sides 121 and 122. As the glass pieces are colored, the words on the stencils will not show through them unless a light is placed behind the stencils. It can then be seen that if a light is placed behind the "Vacant" stencils 138 and 139 and none behind the "Hired" stencils 147 and 148, the word "Vacant" will appear in the openings 132 and 134 whereas the openings 133 and 135 will remain blank and vice versa. Thus, the proper control of the lights behind the various stencils enables the indicator, were it mounted on a taxicab or conveyance, to show the condition of the vehicle, such condition of the vehicle being observable from a great distance. From the construction of the casing 120, it is obvious that said casing is tamper-proof and any parts that are contained therein would be protected from molestation. Any attempt by a driver to gain access to any of the parts contained in the casing would be detectable, as to do so, he would have to noticeably damage the casing. This will insure against tampering as the driver would have to account for any meddling that might be done on the casing.

Means are also provided for illuminating the upper and lower or "vacant" or "hired" compartments of the indicator. In the upper compartment, the electric bulbs 160 and 161, Figs. 10, 11, 12, 13 are mounted in the sockets 162 and 163, fixed to the partition 131. The bulb 160 is energized through the wires 164 and 165, secured to the socket 162, and the bulb 161 is energized through the wires 166 and 167 secured in the socket 163. The wires 164 and 166 and the wires 165 and 167 are connected to each other, thus placing the bulbs 160 and 161 in parallel and causing both to light when the wires are properly energized. In the lower compartment the electric bulbs 168 and 169 are mounted in the sockets 170 and 171, fixed to partition 131. Held in the socket 170 are the wires 172 and 173 which energize the bulb 168. The wires 174 and 175 are connected to the socket 171 and energize the bulb 169. The wires 172 and 174 and the wires 173 and 175 are electrically connected to each other, putting the bulbs 168 and 169 in parallel, thereby causing simultaneous illumination of the same. Two bulbs are used in each compartment so as to secure a better distribution of light and also to insure illumination in case one of the bulbs should burn out.

Means are also provided to prevent the seepage of a strong external light through the glass and stencil of an unlighted compartment on to and through the stencil and glass of the opposite side of the compartment, thereby, especially in the daytime, preventing confusion in reading the indicator. In other words, these means insure that the word in the opening of the illuminated compartment will be the only word visible irrespective of any effect that an external light would have on the unlighted compartment. As embodied in Figs. 10, 11, 12 and 13, the shields 180 and 181 are placed in the center of the upper and lower compartments respectively, thus preventing the passage of light from one side of a compartment to the other side. It is therefore apparent that if light from an external source should pass through the glass and stencil of a side of an unlighted compartment, it will strike the shield which would prevent it from reaching opposite side of the compartment and therefore it would have no effect on the stencil and glass of said opposite side of the compartment. Also, the word on the side of the unlighted compartment through which the external light is passing would not show as a light from the interior of the compartment must be thrown on the stencil before the word will appear in the opening of the indicator. The shields 180 and 181 are provided with openings 182 and 183, Fig. 11, which allow the light from the bulbs 160 and 168 to illuminate both sides of their respective compartments. Like openings are also provided in the shields 180 and 181 for the lights 161 and 169, but are not shown as the shield is broken away in the portion referred to. Covering the portion of the openings 182 and 183 nearest to the partition 131 are the formed pieces 185 and 186 fixed to the shields 180 and 181. These formed pieces 185 and 186 are bent to clear the sockets 162 and 170 and are used to prevent light from passing through the openings in the shields caused by the presence of the sockets. Similar formed pieces are used to cover the openings in the shields due to the sockets 163 and 171, one of said formed pieces being shown in plan in Fig. 10. The shields 180 and 181 are made removable so that the lights 160, 161 and 168, 169 can be renewed. In Figs. 10 and 11 said shields have rotatably mounted thereon the knobs 187 to which are affixed the bent arms 188 which engage with one leg of the angle pieces 189 fixed to the top 123 and the partition 131 and also with one leg of the angle pieces 190 secured to the bottom 124 and the partition 131. If the shields 180 and 181 are to be removed, the knobs 187 are turned until the bent arms 188 are out of engagement with said legs of the angle pieces 189 and 190, thereby allowing the removal of said shields.

Means are further provided for securing the indicator to the taxicab or conveyance and also for securing the wire leading means to the same. Fixed to the bottom 124 of the casing 120, Figs. 10 and 11, are the reinforcing pieces 200 and 201 in which are the holes 202, 203, and 204, 205 respectively. In the piece 200 there is also formed an opening 206. The holes 202, 203, 204 and 205 extend through the bottom 124 and are used to retain bolts which secure the indicator to the vehicle. The opening 206 also extends through the bottom 124 and is used to retain a wire leading means fixture. Figs. 16 and 17 show the application of the means for securing the indicator to the taxicab and the wire leading means to the indicator and taxicab. In Fig. 17, the bolts 207 and 208 extend through the roof of the vehicle 209 and the holes 202, 203 in the reinforcing pieces 200 and the bottom 124. The bolts 207, 208 have mounted thereon the collars 210, 211 and the washers 212, 213 which space the indicator a fixed distance from the roof of the vehicle 209 so that the end 125 may be opened without striking said roof. The nuts 214, 215 and the check nuts 216, 217 on the bolts 207, 208 securely hold the indicator in its fixed postion on the roof of the vehicle. As the nuts which secure the bolts are on the inside of the container of the indicator and the construction of the bolt heads is such that it is impossible to withdraw the bolts unless the nuts are removed, it can be seen that it is impossible for a driver to tamper with the securing means. In Fig. 16 is shown the means for securing the wire leading means fixture 220 to the vehicle and indicator. The fixture 220 is of tubular construction and is formed to shape an elbow, one end 221 being threaded and the other end 222 having secured thereto a tubular member 223 through which the wires feeding the lights are led. The fixture 220 has a shoulder 224 which engages the fixture 220 to the roof as shown when the washer 225 and the nut 226 are placed in position. The threaded end 221 of the fixture 220 extends through the opening 206 in the reinforcing piece 200 and the bottom 124. The washers 227, 228 encompass the threaded end 221, and the nuts 229, 230 securely hold the indicator, the fixture 220 and the washers 227, 228 in place as shown. From the construction shown, it is obvious that it is impossible to withdraw the fixture 220 from the roof of the vehicle or the indicator unless one has access to the interior of the indicator to unfasten the nut 230. As the indicator is locked and only the proper parties have access to its interior, it can be seen that the fixture 220 cannot be withdrawn by the driver or other molesting persons so as to tamper with the wires contained therein. In Fig. 11 there is shown in the shield 181 an opening 231 which is directly over the fixture 220 and is formed so as to clear the wire and connection plug which issue from said fixture. The means used for securing this modified form of indicator and the fixture 220 to the roof of a vehicle can also be used for securing the rotary indicator and its wire leading means to said roof in a like manner. In Fig. 2 the base 1 of the rotary indicator is shown provided with the holes 99, 100, 101, 102 used for retaining the bolts which secure said indicator to the roof of a vehicle, the construction being similar to that shown in Fig. 17. The opening 103 in the base 1, Fig. 2, is used to retain a fixture of a construction, as shown in Fig. 16, for leading wires to the interior of said indicator.

The modified form of indicator operates as follows: It will be assumed that the indicator is controlled from a type of fare recorder or taximeter such as is disclosed in our co-pending application, and that for a starting position the taximeter and the indicator will register "Vacant". With the taximeter registering "Vacant", the flag and staff will be in the upright or vertical position and the word "Vacant" will appear in the openings 132, 134 of the indicator as the bulbs 160, 161 are illuminated. When the taxicab or conveyance is hired, the driver turns the wing nut on the back of the taximeter, thus lowering the flag. When the flag reaches its midway or predetermined position, the automatic control comes into action and automatically, out of the control of the driver, sets the indicating and recording mechanism of the taximeter in the "hired" or recording position, all as fully described in our co-pending application hereinbefore mentioned. Simultaneous with this setting the automatic control also actuates a mechanism in the taximeter, which extinguishes the bulbs 160, 161, and illuminates the bulbs 168, 169 in the indicator, thus causing the word "Vacant" to disappear from the openings 132, 134 and the word "Hired" to appear in the openings 133, 135. With the indicator so mounted on the top of the taxicab or conveyance so that it appears from the front of the vehicle as shown in Fig. 9, it is evident that the condition of the vehicle, whether "vacant" or "hired", will be readily discernable at a distance from either the front or rear by reading the word which appears in the openings. When the driver discharges a passenger, he turns the wing nut on the taximeter and the automatic control sets the indicating and recording mechanism of the taximeter in a "cash" or temporary non-recording position. During this operation the indicator openings 133, 135 still show "Hired" and the openings 132, 134 still remain blank as the vehicle is hired until the passenger pays his fare. When the passenger has paid his fare, the driver again turns the wing nut thus raising the flag and staff from its horizontal or "hired" position to its vertical or "vacant" position. When the flag reaches the midway or predetermined position, the automatic control again comes into operation, thus setting the indicating and recording mechanism of the taxicab in the "vacant" or non-recording position and also actuating a mechanism in the taximeter which extinguishes the bulbs 168, 169 and illuminates the bulbs 160, 161 of the indicator, thus causing the openings 133, 135 to be blank and the openings 132, 134 to register "Vacant". It is evident from the foregoing description that the indicator is controlled from the taximeter and as said taximeter is out of the control of the driver, due to the automatic control it is obvious that at no time can the driver govern the functioning of the indicator so that it will show a false reading.

The circuit of the bulbs 160, 161, 168, 169 has a key switch which is mounted in the taximeter and which is used to shut off the supply of electrical current from the bulbs when the vehicle is not in use, that is, when it is in the garage or storage. The owner or operator of the taxicab or conveyance has possession of the key for the key switch and, therefore, the driver can at no time extinguish the bulbs. The operation of the key switch will be described later. In this type of modified indicator it is evident that either "Vacant" or "Hired" must at all times, while the vehicle is in operation, appear in the indicator and, therefore, if either of the words does not appear, it would be obvious that, unless the bulbs were burned out, the driver was tampering with the system, and in that case he could be made to account for any molestation.

*Mechanism for controlling the rotary indicator.*

Figure 18:
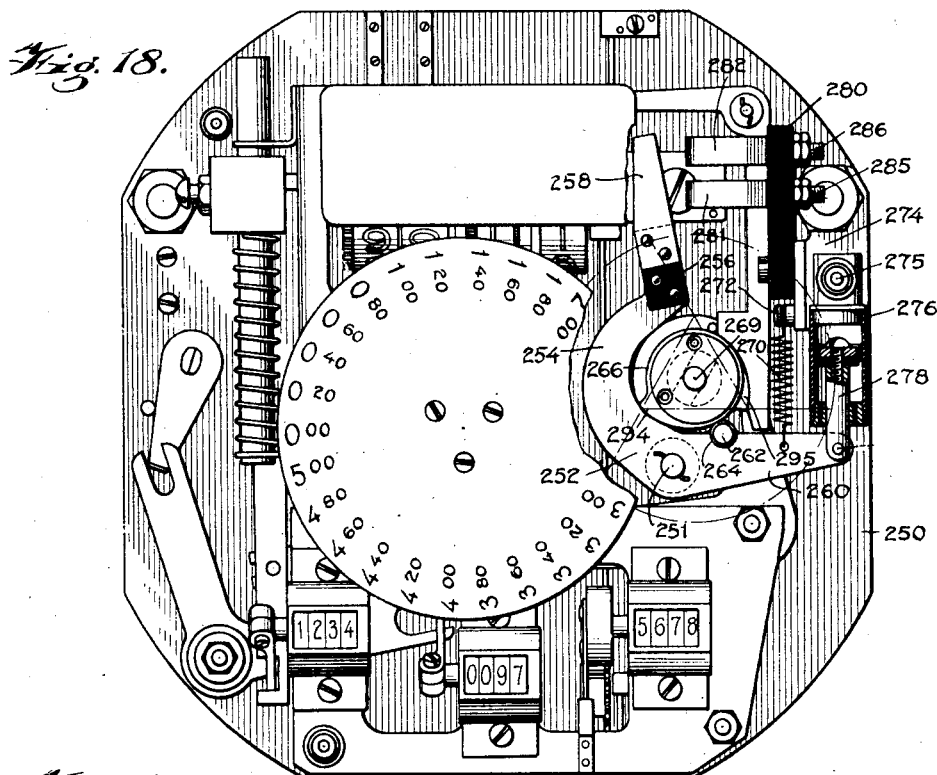
Fig. 18 is a front elevation of the main plate of the taximeter showing the mechanism for controlling the rotary indicator magnet circuit.
Figure 19:
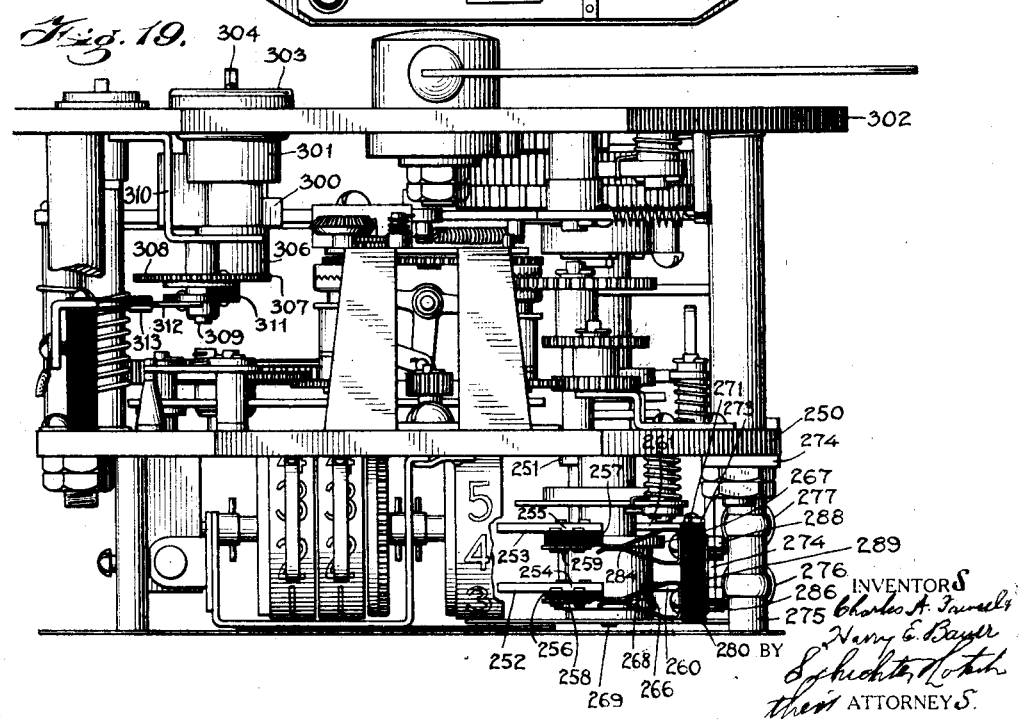
Fig. 19 is a plan view of the taximeter mechanism with the case and parts removed.

To the main plate 250 of the taximeter, Figs. 18, 19, 20, is affixed a stud 251 upon which are rotatably mounted two armed levers 252, 253, said levers having arms 254, 255 provided with pieces of insulation 256, 257 to which are secured the electrical conducting blades 258, 259. The other arms 260, 261 of said levers have affixed thereon the studs 262, 263 upon which are mounted the rollers 264, 265 which coact with the cams 266, 267 secured on a hub 268 affixed to the cam shaft 269. The arms 260, 261 are spring retained in the position shown by the springs 270, 271 the ends of which are secured to said levers and to the studs 272, 273 affixed to the bracket 274 mounted on the main plate 250. Pivotally mounted on the stud 275 are the dash-pots 276, 277, the piston rods 278 of which are secured to the arms 260, 261 of the levers 252, 253 by the pin and slot connections 280, 281. The upper end of the piston rods 278 have affixed thereto the usual form air valve and piston comprising leather and metal washers. The portion of the dash pots 276, 277 above the pistons, have small holes which regulate the escape of air from the dash pots. When the dash pots 276, 277 are actuated by a downward movement of the arms 260, 261, air is drawn into the upper part of said dash pots and imprisoned there by the pistons. The return of the arms 260, 261 and hence the levers 252, 253, is thus retarded; their return depending on the length of time it will take the springs 270, 271 to force the air in the upper portion of dash pots to escape through the holes therein. The purpose of retarding the return of the levers 252, 253 will be hereinafter described.

Mounted on a block of insulation 280, affixed to the bracket 274, are the springs contacts 281, 282 and 283, 284 (see also Fig. 8), which are held in position by the fastening means 285, 286 and 287, 288. The fastening means 286, 288 and, therefore, the spring contacts 282, 284, are electrically connected by the bus 289 from which a wire 290 is led. The spring contacts 281, 283 are electrically connected to a remote source by the wires 291, 292, secured to the fastening means 285, 287.

Thus, when the conducting blade 258 is moved into engagement with the spring contacts 281, 282, the electrical circuit between the wires 290, 291 will be completed and in a like manner when the conducting blade 259 is moved into engagement with the spring contacts 283, 284, the electrical circuit between the wires 290 and 292 is completed. Said conducting blades are moved into engagement with said spring contacts when the lobes 294, 295 of the cams 266, 267 coact with the rollers 264, 265 on the arms 260, 261, thus causing the levers 252, 253 to swing in a clockwise direction.

The operation of the mechanism just described is as follows: It is understood that the cam shaft 269 makes one-third of a revolution every time the automatic control actuates it. When the cam shaft 269 makes the first third revolution (starting from the position in Fig. 18), the lobe 294 of the cam 266 strikes the roller 264 of the arm 260 thereby causing the lever 252 to rotate in a clockwise direction, thus engaging the conducting blade 258 with the spring contacts 281, 282 which closes the circuit of the wires 290, 291 and hence energizes the magnet 20, shown in Fig. 4 and so causing the rotary indicator to show "Hired", which is also the position that the indicating and recording mechanism of the taximeter is set in by this first one-third revolution of the cam shaft 269. The construction of the lobe 294 is such that it will be entirely out of the path of the roller 264 when the cam 266 has completed its first one-third revolution so that the lever 252 may return to its original position. As the cam shaft 269 is spring actuated by the automatic control, it is obvious that unless some retarding means were affixed to the lever 252 the conducting blade 258 would make and break its engagement with the spring contacts 281, 282 so quickly that the magnet 20 would not be sufficiently energized to actuate the indicator. Therefore, the dash-pot 276 is secured to the lever 252 and retards the motion of the conducting blade 258 so that it stays in engagement with the spring contacts 281, 282 long enough to sufficiently energize the magnet 20 to allow it to perform its function.

The second one-third revolution of the cam shaft 269 sets the mechanism of the taximeter in the "cash" or temporary non-recording position. During this portion of the revolution neither the lever 252 nor the lever 253 is actuated, thus leaving the indicator in the "hired" position. However, on the third one-third revolution of the cam shaft 269, which places the taximeter mechanism in the "vacant" position, the lobe 295 of the cam 267 strikes the roller 265 of the lever 253, thus causing the conducting blade 259 to engage with the spring contacts 283, 284, hence closing the circuit of the wires 290, 292 which energizes the magnet 21 thereby causing the indicator to show "Vacant". The dash-pot 277 retards the return of the lever 253, thus allowing sufficient time of engagement between the conducting blade 259 and the spring contacts 283, 284 to properly energize the magnet 21.

A key switch is also mounted in the taximeter to control the bulbs 87, 94 of the rotary indicator. In Figs. 19, 20, 21 and 22 a lock 300 is held in a bushing 301 affixed to the back plate 302. A dust cap 303 is pivoted on a pin 304, secured in the bushing 301 and prevents the entrance of foreign matter into the key slot 305 of the barrel 306 in the lock 300. The barrel 306 has affixed to its other end a gear 307 which engages with a gear 308 mounted on a stud 309 affixed to a bracket 310 secured on the back plate 302. The ratio of the gears 307, 308 is so proportioned that one revolution of the gear 307 will impart one-half of a revolution to the gear 308. Affixed to the gear 308 is the insulation 311 upon which is secured the electrical conducting blade 312 shown in engagement with the electrical spring contacts 313, 314. The wires 315, 316 are secured to the extensions 317, 318 of the spring contacts 313, 314 thus electrically connecting said spring contacts to a remote source. The spring contacts 313, 314 are mounted on the insulation 319 affixed to the main plate 250. When a key is inserted in the slot 305 of the lock 300 and turned, it must be turned one revolution in either direction before it can be removed. This turning of the key rotates the barrel 306 and hence the gear 307 one revolution thereby causing the gear 308 to turn one-half revolution, thus disengaging the conducting blade 312 from the spring contacts 313, 314 which breaks the circuit of the wires 315, 316, causing the bulbs 87, 94 in the rotary indicator to be extinguished. Further turning of the key will again engage the conducting blade 312 with the spring contacts 313, 314, thus again illuminating the bulbs 87, 94. The key for the lock 300 is held by the owner or operator of the taxicab and therefore the driver has no control whatsoever over the operation of the illuminating means of the indicator. The bulbs 87, 94 are only extinguished when the taxicab is not in operation, that is, when it is in storage or in the garage. Means are provided for leading the wires in the taximeter to an outside source. As embodied in Figs. 20, 21 and 26, a switch plug 330 has a female insulation member 331 fixed to the main plate 250 and the clock mechanism plate 332 and also a male insulation member 333 extending in the opening 334 of the taximeter case 335. The female insulation member 331 has mounted therein the electrical contacts 336, 337, 338, 339 which engage with the electrical contacts 340, 341, 342, 343, mounted in the male insulation member 33. It will be noticed that there is a greater space between the electrical contacts 338 and 339 mounted in the female insulation member 331 than between the electrical contacts 337, 338 and 336, 337, and that a similar formation is embodied in the electrical contacts 340, 341, 342, 343 mounted in the male insulation member 333. This formation is so arranged that it is impossible when engaging the male and female members to place them in any position except as shown, thereby preventing any possibility of accidentally engaging them in an incorrect manner and change the wiring of the circuit. The electrical contacts 336, 337, 338, 339 have respectively affixed thereto the wires 291, 292, 290, 315 which have been heretofore described. Secured to the electrical contacts 340, 341, 342, 343 are the wires 344, 345, 346, 347 which are clamped to the male insulation member by an insulation strip 348, thus insuring said wires from being disengaged from said electrical contacts when the male insulation member 333 is withdrawn from the female insulation member 331. The wires 344, 345, 346, 347 extend through an elbow 350 which is secured to a bracket 351 by a nut 352. To the elbow 350 is affixed the tubular member 353 through which said wires are led to a remote source.

The bracket 351 is affixed to a portion of the frame of the taxicab or conveyance and carries the taximeter. The taximeter is secured to the bracket 351 by the screw fastenings 354, 355 extending through said bracket and the case 335. The screw fastening 355 is sealed by a seal 356 thus preventing the removal of the taximeter from the bracket 351 by improper parties and hence securing from molestation the wire leading means 350, 353 which cannot be removed unless the taximeter is taken off said bracket. The slack shown in the wires 344, 345, 346, 347, as they enter the elbow 350, is due to the extra length of wire needed when inserting the male member 333 of the switch plug 330 into the female member 331. From the construction shown, it is obvious that both the taximeter and the wire leading means are so mounted that it is impossible for the driver to tamper with them without being detected.

*Mechanism for controlling circuit in the modified form of indicator.*

In Figs. 23 and 24 the main plate 250 of the taximeter has affixed thereto the stud 370 upon which are pivotally mounted the two armed levers 371, 372. The arms 373, 374 of said levers have secured thereto the studs 375, 376, upon which are mounted the rollers 377, 386 coacting with the cams 379, 380 which are fixed to the cam shaft 269. The springs 381, 382 are also secured to the arms 373, 374 and are held at their other ends by the studs 383, 384 mounted on a bracket 385, affixed to the main plate 250. The springs 381, 382 retain the rollers 377, 386 against the cams 379, 380 and tend to swing the levers 371, 372 in a counter-clockwise direction. The other arms 387, 388 of the two armed levers 371, 372, have affixed thereto the insulations 389, 390, to which are secured the electrical conducting blades 391, 392 which engage respectively with the electrical spring contacts 393, 394 and 395, 396. The spring contacts 393, 394 and 395, 396 are held by the securing means 397, 398 and 399, 400 to a block of insulation 401, affixed to the bracket 385. A bus 402, held by the securing means 397, 399, electrically connects the spring contacts 394, 396 together and a wire 403 is led therefrom to electrically connect said spring contacts to a remote source. The securing means 398, 400 have affixed thereto the wires 404, 405 respectively, which electrically connect the spring contacts 393, 395 to a remote source. The cams 379, 380 have the lobes 407, 408 which when in engagement with the rollers 376, 378, swing the levers 371, 372 in a clockwise direction, thereby throwing the conducting blades 393, 394 into engagement with the spring contacts 393, 394 and 395, 396, thus closing the circuit of the wires 403, 404 and 403, 405. The roller 378 is shown in engagement with the lobe 408, thereby causing the conducting blade 394 to engage with the spring contacts 395, 396. The lobe 407 is so formed that the conducting blade 391 is in engagement with the spring contacts 393, 394 when the taximeter mechanism is in the "hired" and "cash" positions and out of engagement when said mechanism is in the vacant position. The construction of the lobe 408 is such that the conducting blade 392 is in engagement with the spring contacts 395, 396 when the taximeter mechanism is in the "vacant" position, and out of engagement when said mechanism is in the "hired" and "cash" positions. The operation of the mechanism is as follows: The cam shaft 269 is actuated by the automatic control mechanism and, as before described, makes a revolution in three steps to complete the cycle of the taximeter mechanism thereby setting said taximeter mechanism in its successive positions, namely, "Hired", "Cash" and "Vacant". As shown in Fig. 23, the mechanism is in the "vacant" position. In this position the conducting blade 392 is in engagement with the spring contacts 395, 396 thus closing the circuit of the wires 403, 405 which energizes the bulbs 160, 161 of the modified form of indicator, Fig. 11, thereby illuminating said bulbs and causing the word "Vacant" to appear in the openings 132, 134 of the indicator. When the taximeter mechanism is set in the "hired" position by the automatic control, the cam shaft 269 and hence the cams 379, 380 are turned in a counter-clockwise direction one third of a revolution. This action causes the lobe 408 of the cam 380 to turn out of the path of the roller 378 and hence the spring 382 swings the lever 372 in a counter-clockwise direction, thus disengaging the conducting blade 392 from the spring contacts 395, 396, thereby breaking the circuit of the wires 403, 405 which extinguishes the bulbs 160, 161 and causes the word "Vacant" to disappear from the openings 132, 134 of the indicator. Simultaneous with this action, the lobe 407 of the cam 379 throws the roller 377 out of its path thereby vibrating the lever 371 in a clockwise direction which throws the conducting strip 391 into engagement with the spring contacts 393, 394, hence closing the circuit of the wires 403, 404 and causing the bulbs 168, 169 to be illuminated and the word "Hired" to appear in the openings 133, 135 of the indicator shown in Fig. 11. Therefore, with the taximeter in the "hired" position, it is evident that the indicator also shows "hired", thereby informing persons at a distance of the condition of the taxicab or conveyance upon which said taximeter and indicator are mounted. The next operation of the automatic control sets the taximeter mechanism in the "cash" or temporary non-recording position and rotates the cam shaft 269 another one-third of a revolution. During this one-third of a revolution it can be seen that the roller 377 will remain on the lobe 407 of the cam 379 thus leaving the lever 371 in the same position as the "hired" position, and hence the word "Hired" will still show in the indicator. In a like manner the roller 378 will remain in engagement with the low part of the cam 380 and the circuit of the wires 403, 405 will remain broken and hence the openings 132, 134 of the indicator will remain blank. The third operation of the automatic control sets the taximeter mechanism in the "vacant" or non-recording position and rotates the cam shaft 269 one third of a revolution to the position as shown in Fig. 23. As the cams 379, 380 turn this one-third revolution, the roller 377 drops off the lobe 407 of the cam 379 and the lever 371 is rotated in a counter-clockwise direction under impulsion of the spring 381 thereby disengaging the conducting blade 391 from the spring contacts 393, 394 which breaks the circuit of the wires, 403, 404, and causes the lights 168, 169, of the indicator to be extinguished and the word "Hired" to disappear from the openings 133, 135. Simultaneously, the lobe 408 of the cam 380 throws the roller 378 out of its path thereby swinging the lever 372 in a clockwise direction, thus again engaging the conducting blade 392 with the spring contacts 395, 396 and closing the circuit of the wires 403, 405, which again illuminates the bulbs 160, 161 and again causes the word "Vacant" to appear in the openings 132, 134 of the indicator, informing those interested that the taxicab is for hire. As the control of the indicator in each embodiment of the invention is governed from the automatic control mechanism, it is obvious that at no time will the driver of the taxicab be able to manipulate the indicator in any manner whatsoever to show a false reading.

The key switch described for the use of the rotary indicator is also used for the modified form of indicator and for a similar purpose, that is, to cut off the supply of electric current to the bulbs 160, 161, 168, 169 when the taxicab or conveyance is in storage or in the garage. The owner or operator of the taxicab, of course, has possession of the key for said key switch, so that the driver can at no time tamper with the indicator by operating the lock.

The wires for controlling the operation of the modified form of indicator are led from the taximeter by the plug switch 410 shown in Fig. 25. The construction of the plug switch 410 is similar to the plug switch 330 shown in Figs. 20, 21 and 26 but contains only three contact members instead of four. Said plug switch consists essentially of the female insulation member 411 mounted between the main plate 250 and the clock mechanism plate 332 and the male insulation member 412 which extends in the opening 344 of the taximeter case 335. The female insulation member 411 has fixed therein the electrical contacts 413, 414, 415 which are slidably engaged with the electrical contacts 416, 417, 418 mounted in the male insulation member 412. As in the plug switch 330, the plug switch 410 has the electrical contacts 414, 415 spaced further apart than the contacts 413, 414, thus preventing improper engagement of the male and female insulation members when installing the same. The electrical contacts 413, 414, 415 have secured thereto, respectively, the wires 404, 316, 405 which have been heretofore described and to the electrical contacts 416, 417, 418 are affixed the wires 419, 420, 421 which are clamped to the male insulation member 412 by an insulation strip 422, thus preventing accidental disengagement of said wire from said electrical contacts. The wires 419, 420, 421 are led from the male insulation member 412 through tamper proof means to a remote source, the construction of said means being like those shown in Figs. 20 and 21 incorporating the elbow 350 and the tubular member 353. It is therefore obvious that the wires 419, 420, 421 are free from molestation, thereby preventing the driver or other improper parties from tampering with said wires and hence interfering with the operation of the indicator.

*Wiring diagram for rotary indicator.*

Figure 8:
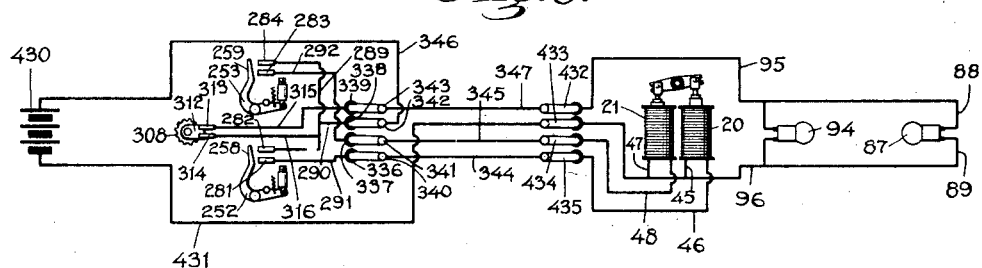
Fig. 8 is a wiring diagram of the lights and magnets in the rotary indicator and the means for energizing and controlling the same.

In the wiring diagram, Fig. 8, the parts of the various mechanism, heretofore described, which are essential for the control and operation of the various electrical devices, are shown diagrammatically and have the same identification numbers, in which a source of electrical energy,—a battery 430, is connected to a wire 346 which is led through the contacts 342, 338 of the plug connection 330 to the wire 290 in the interior of the taximeter, and to a wire 431 which is led through a plug connection 433 to the wire 96 in the interior of the rotary indicator. The wire 290 is connected to the common bus 289 from which extends the wire 316 of the key switch. The key switch is shown in the closed position and, therefore, its conducting blade 312 completes the circuit between the wires 316 and 315. The wire 315 connects through the contacts 339, 343 to the wire 317 outside of the taximeter which in turn, through a plug connection 432 joins with a wire 95 inside the indicator. The wire 95 is attached to the bulb 94 and the wire 88, joined to the wire 95, is attached to the bulb 87. The other side of the bulb 94 is connected to the wire 96 to which is fastened the wire 89 joining the other side of the bulb 87. A complete circuit is thus effected and the bulbs 87, 94 are illuminated. This circuit is completed as follows: The current from the battery 430 flows through the wire 346, the contacts 342, 338, the wire 290, the bus 289, the wire 316, the conducting blade 312, the wire 315, the contacts 339, 343, the wire 347, the plug connection 432, the wire 95, the bulbs 87, 94, the wire 96, plug connection 433, the wire 431 and hence back into the battery 430. It can be seen that if the conducting blade 312 is disengaged from the spring contacts 313, 314 by turning the key switch, the circuit just described is broken as the wires 315, 316 are disconnected and hence the bulbs 87, 94 would be extinguished. In this manner, the owner or operator of the taxicab having possession of the key for the key switch has complete control over the functioning of the lights 87, 94 of the indicator.

The wire 45 of the magnet 20 in the indicator is joined to the wire 96 and hence to the battery 430 through the plug connection 433 and the wire 431. The other wire 46 of said magnet is connected to the wire 344 outside of the indicator by a plug connection 435. The wire 344 through the contacts 340, 336, is joined to the wire 291 inside the taximeter which in turn is fastened to the spring contact 281. The other spring contact 282 is attached to the bus 289 thereby connecting said spring contact to the battery 430 through the wire 290, the contacts 338, 342 and the wire 346. Thus, when the conducting blade 258 of the lever 253 is thrown into engagement with the spring contacts 281, 282, a circuit is completed and the magnet 20 is energized, hence causing the indicator to show "Hired". The conducting blade 258 does not remain in engagement with the spring contacts 281, 282 except for the length of time it takes to properly energize the magnet 20, as has been heretofore described.

The magnet 21 is also connected to the wire 96 by the wire 47 and hence to the battery 30 through the plug connection 433 and the wire 431. The other wire 48 of the magnet 21 is connected to the spring contact 283 in the taximeter through a plug connection 434, the wire 345, the contacts 341, 337 and the wire 292. The other spring contact 284 is joined to the bus 289 and hence out of the taximeter to the battery 430 through the wire 290, the contacts 338, 342 and the wire 346. The magnet 21 is then energized when the conducting blade 259 of the lever 253 engages with the spring contacts 283, 284, thereby closing the circuit of said magnet, thus causing the word "Vacant" to appear in the indicator. Like the conducting blade 258, the conducting blade 259 remains engaged with its spring contacts 283, 284 only long enough to properly energize the magnet 21.

Wiring diagram for modified form of indicator.

In Fig. 15 the wires 164, 166 of the bulbs 160, 161 in the indicator are joined to the wire 442 which is led out of said indicator through the plug connection 439 and hence into the taximeter by contacts 418, 415 of the plug switch 410, through the wire 421. Attached to the contact 415 is the wire 405 which is led to the battery 430 through the spring contact 395, the conducting blade 392, the spring contact 396, the wire 403, the wire 315, the spring contact 313, the conducting blade 312, the spring contact 314, the wire 316, the contacts 414, 417 and the wire 420. To the other side of the battery 430 is joined the wire 436 connecting with the wire 441 in the indicator through the plug connection 438. The wire 441 has attached thereto the other wires 165, 167 of the bulbs 160, 161, thus completing the circuit of said bulbs and causing their illumination. With the bulbs 160, 161 illuminated, the indicator will show "Vacant".

The wires 172, 174 of the bulbs 168, 169 are joined to a wire 440 which is connected to the spring contact 393 in the taximeter through the plug connection 437, the wire 419, the contacts 416, 413 and the wire 404. The other wires 173, 175 of the bulbs 168, 169 are attached to the wire 441 which joins the other spring contact 394 in the taximeter through the plug connection 439, the wire 436, the battery 430, the wire 420, the contacts 417, 414, the wire 316, the spring contact 314, the conducting blade 312, the spring contact 313, the wire 315 and the wire 403. It is obvious that the circuit of the bulbs 168, 169 is open between the spring contacts 393, 394 and therefore said bulbs are not illuminated.

However, when the conducting blade 391 engages with said spring contacts the circuit is closed and the bulbs 168, 169 are illuminated, thus causing the indicator to show "Hired". When the conducting blade 391 engages with its spring contacts 393, 394, the conducting blade 392 disengages with its spring contacts 395, 396, hence breaking the circuit of the bulbs 160, 161, thereby extinguishing them and causing the word "Vacant" to disappear from the indicator. Thus, the word "Hired" will alone appear in the indicator. In a like manner, when the bulbs 160, 161 are again illuminated, the circuit of the bulbs 168, 169 is broken and hence only the word "Vacant" will appear in the indicator. On inspection of the circuits just described, it is evident that if the conducting blade 312 of the key switch is disengaged from the spring contacts 313, 314 by the turning of the key of said key switch, both of said circuits will be broken and it will be impossible to illuminate either the bulbs 160, 161 or the bulbs 168, 169. This key switch is actuated only by the owner or operator of the taxicab or conveyance when the vehicle is in storage or in the garage. As the driver has no key, he will be unable at any time to tamper with the indicator through the key switch.

Installation of indicator on taximeters.

In the installation shown in Fig. 14, the modified type of indicator is illustrated as affixed to the roof of a taxicab. However, as there is no material difference in the installation of either the rotary or modified indicators, the one illustration will suffice for both. The modified form of indicator 450 is secured to the roof of the taxicab 451 by the means shown in Figs. 16 and 17. The wires 419, 421 and a portion of the wire 436, Fig. 15, are led through the elbow 220, Fig. 16, and the tubular member 223 affixed to the taxicab frame to a T 452 shown in Fig. 14. A tubular member 353, Figs. 14 and 21, extends from one side of the T 452 and carries the wires 419, 421 and a portion of the wire 420 of Fig. 15 into the taximeter 453 through the elbow 350. The other portions of the wires 420 and 436 are led from the T 452 in a tubular member 454 secured to the taxicab frame to the battery 430.

The rotary indicator is affixed to the taxicab 451 in the same manner as the modified type of indicator. However, in the case of the rotary indicator, the wires 344, 345, 347 and a portion of the wire 431 is led through the tubular member 223, Fig. 14, to the elbow 452. The wires 344, 345, 347 and a portion of wire 346 are then led from the elbow 452 into the taximeter 453 through the tubular member 353 and the elbow 350. The tubular member 454 carries the remaining portions of the wires 431, 346 to the battery 430.

The automatic control.

As before stated, the functioning of the indicators is governed by the automatic control and is out of the control of the driver. In Fig. 20, the cam shaft 269 which actuates the circuit closing means of the rotary indicator magnets is shown connected to the automatic control mechanism and also to said circuit closing means and in Figs. 23 and 24 said cam shaft is shown actuating the circuit closing means of the bulbs of the modified form of indicator, thereby showing that the automatic control completely governs the functioning of the indicators. As embodied in Figs. 20 and 22, the mutilated gear 460 is affixed to the shaft 461 of the wing nut 462 journaled in the back plate 302 of the taximeter. The mutilated gear 460 meshes with the gear 463 and their ratio is so proportioned that one revolution of the mutilated gear 460 imparts one-third of a revolution to the gear 463. The gear 463 is affixed to the cam and ratchet wheel 464 both being secured to a bushing 465 mounted on a stud 466 fixed in the back plate 302. A pin 467 mounted on the gear 463 retains one end of a spiral spring 468 the other end of which is secured to a hub 469 of an escapement wheel 470. The escapement wheel 470 is rotatably mounted on a stud 471 fixed in the stud 466 and has a tooth 472 formed on its periphery. The hub 469 has a slot 473 which engages with a flattened portion 474 of the cam shaft 269, thus compelling said cam shaft to turn whenever the hub 469 is rotated. The tooth 472 is in engagement with a notch 475 of a lever 476 which has an arm 477 in the path of the pin 467. The lever 476, together with a lever 478, are pivotally mounted on a stud 479 fixed in the back plate 302 and a spring 480 secured to said levers retains them in the position shown against the periphery of the escapement wheel 470. The lever 478 has a notch 481 which is in the path of the tooth 472 and has also a face 482 in the path of the pin 467. A third lever 483 is pivotally mounted on a stud 484 fixed in the back plate 302. The lever 483 has a notch 485 which when against the periphery of the escapement wheel 470 is in the path of the tooth 472 and also an arm 386 which is in the path of the pin 367. A spring 487 is secured to the lever 483 and a pin 488 affixed to the back plate 302. Said spring tends to rotate the lever 483 in a counter-clockwise direction, thus holding it against the circumference of the escapement wheel 470 when the pin 467 is out of the path of said lever. A spring brake 489 secured to the back plate 302 retains the cam and ratchet wheel 464 in the positions it is set by the mutilated gear 460 and a pawl 490, also mounted on the back plate 302, engages with the teeth of the cam and ratchet wheel 464, thus preventing clockwise rotation of the same. A gear segment 491, pivotally mounted on the back plate 302 and actuated by the cam and ratchet wheel 464 is in engagement with a mutilated gear 492 journaled in the back plate 302 on a shaft 493. The shaft 493 has affixed thereto the staff 494 of the flag 495. The actuation of the segment 491 turns the mutilated gear 492 in a clockwise direction one quarter of a revolution, thus at the proper time changing the staff 494 from the vertical position indicating "vacant" to the horizontal position indicating "hired". Further actuation of the segment 491 again turns the staff 494 to its vertical or "vacant" position.

The operation of the mechanism just described is as follows: As shown, the mechanism is in the "vacant" position, and, therefore, the flag 495 and the staff 494 are in the vertical or upright position. When a passenger hires the taxicab, the driver, to set the taximeter in the "hired" or recording position, turns the wing nut 462 of the taximeter one revolution in a clockwise direction, thereby rotating the gear 460 one revolution in the same direction and hence the gear 463 one-third of a revolution in a counter-clockwise direction. When the gear 463 is turned, it is obvious that the slot 473 of the hub 469 and hence the cam shaft 269 remains stationary as said hub is not fixed to the gear 463. However, when the pin 467 of the gear 463 strikes the arm 477 of the lever 476, it rocks said lever in a counter-clockwise direction, thereby releasing the tooth 472 from the notch 475, thus allowing the escapement wheel 470 and hence the cam shaft 269 to turn, under impulsion of the spiral spring 470, one-third of a revolution or until the tooth 472 strikes the notch 481 of the lever 478. This one-third of a revolution of the cam shaft 269 sets the indicating and recording mechanism of the taximeter in the "hired" position and, also, as before described, causes the indicator on the roof of the taxicab to show the word "Hired". It is also evident that the driver has no control over the operation of the cam shaft 269 as the functioning of said cam shaft is entirely governed by the spiral spring 470 and therefore he can at no time set the cam shaft 269 in a position that would incur the improper operation of the taximeter or indicator mechanisms for his own personal gain. As the gear 463 is turned to set the taximeter in the "hired" position, the cam and ratchet wheel 464 actuates the flag mechanism thereby lowering the flag 495 and its staff 494 from its "vacant" or vertical position to its "hired" or horizontal position. The driver, furthermore, is compelled to lower said flag and staff in a horizontal or "hired" position as the release of the tooth 472 from the notch 475 and, subsequently, the actuation of the cam shaft 269 does not take place until the flag and staff is in a predetermined position, which is substantially midway between the vertical and horizontal positions. If the driver rides with a passenger and has the flag and staff in any position but the horizontal position he is liable to arrest for violating the municipal regulations or to detection by the inspectors of the operating company. In the device of Decker patents, however, the driver was able to set the flag and staff in substantially a horizontal or what is called "notching" position, in which position the taximeter would not function properly and the driver would cheat his employer out of a large portion of the fare. In the device shown in Fig. 22, in which the automatic control is the same as described in our copending application herein mentioned, it is evident that the driver cannot place the flag in substantially a horizontal or "hired" position and still have the taximeter function improperly as said taximeter is, automatically out of control of the driver, and set in the "hired" position by the automatic control when said flag is in the predetermined or midway position. The driver is therefore compelled to lower the flag to the lowermost or "hired" position as he can gain nothing by leaving the flag in the midway position.

When the driver discharges the passenger, he again turns the wing nut 462, thus rotating the gear 463 another one-third of a revolution, thereby setting the taximeter in the "cash" or temporary non-recording position. In this position, the taximeter will not record any fare for a set length of time, hence giving the driver time to make change etc. when discharging the passenger. As before described, the indicator will still show "Hired", for, until the passenger has paid his fare, he still has the taxicab hired. The flag of the taxicab also remains in the horizontal or "hired" position. The automatic control sets the mechanism in the "cash" position out of control of the driver, thereby preventing "notching" or tampering in this position. Said automatic control actuates the cam shaft 269 when the pin 467 of the gear 463 strikes the face 482 of the lever 478, thus swinging said lever downwardly and releasing the tooth 472 from the notch 481, hence permitting the escapement wheel 470 to rotate one-third of a revolution in which position it is retained by the notch 485 of the lever 483 engaging with the tooth 472.

After the driver has collected the fare from the passenger, he again turns the wing nut 462, hence turning the gear 463 its final one-third revolution, thus bringing said gear back to its original position as shown in Fig. 22. This actuation of the gear 463 sets the indicating and recording mechanism of the taximeter in its "vacant" or non-recording position and causes the indicator to show the word "Vacant". The flag 495 is also returned to its "vacant" or vertical position. The indicating and recording mechanism of the taximeter and hence the indicator, being controlled by the cam shaft 269, are not actuated until the pin 267 of the gear 463 strikes the arm 386 of the lever 483, thus releasing the tooth 472 from the notch 485 which allows the escapement wheel 470, with the cam shaft 269, to rotate one-third of a revolution or until the tooth 472 again strikes the notch 475, as shown in Fig. 22. As with the first one-third revolution of the escapement wheel 470, the tooth 472 is not disengaged from the notch 485 until the flag 495 and its staff 494 have reached the predetermined position or position midway between their "hired" and "vacant" positions. The cam shaft 269, being also actuated by the automatic control during its final one-third revolution, it is evident that the driver cannot tamper with the taximeter mechanism or with the functioning of the indicator and hence said taximeter and indicator are free from molestation in all three positions, namely, "Vacant", "Cash" and "Hired".

*Operation of rotary indicator in conjunction with taximeter.*

In order to make more obvious the connection between the taximeter and the rotary indicator, a brief summary of their combined operation will follow. In Fig. 14 it will be assumed that the rotary indicator is mounted on the roof of the taxicab instead of the modified form of indicator. As a starting point, the taxicab will be considered for hire, or vacant. When the taxicab is for hire or vacant, the rotary indicator will indicate "Vacant", as shown in Fig. 1, and the flag 495 of the taximeter will be in its vertical or "vacant" position, as shown in Figs. 14 and 22. Also, the indicating and recording mechanism of the taxicab will be non-operative, except for the totalizing of the total and vacant mileages.

It will now be assumed that a passenger has hired the taxicab. Before the driver starts the taxicab to take the passenger to his destination, he must set his taximeter in the "hired" or recording position. To do so he turns the wing nut 462 on the back of the taximeter, Figs. 14, 20, 21 and 22, which lowers the flag 495 to its horizontal or "hired" position. In so doing, the vacant mileage totalizer will cease functioning and also the automatic control mechanism will be actuated. During this actuation of the automatic control mechanism, as before described, the indicating and recording mechanism of the taximeter will be set in operation and the conducting blade 258, Figs. 8 and 18, will be thrown into engagement with the spring contacts 281, 282, thereby completing the circuit of the magnet 20 in the rotary indicator (Figs. 2, 4 and 7) which, being energized, will rotate the box 50 one-quarter of a revolution, thereby causing the word "Hired" to appear in the openings 7, 8 of said indicator. It is now apparent that both the flag and the rotary indicator are in the "hired" position, thereby making evident to those concerned, the condition of the taxicab. Also, as both the indicating and recording mechanisms of the taximeter and the rotary indicator have been directly actuated by the automatic control mechanism, it is evident that the driver is unable, at any time or in any way, to manipulate said taximeter or indicator to show a false reading for his personal gain.

When the passenger has reached his destination, the driver again turns the wing nut 462, thus actuating the automatic control mechanism which in turn sets the taximeter recording and indicating mechanisms in the "cash" or temporary non-recording position. When in this position, the taximeter does not record any fare for a set length of time, thus giving the driver time to discharge the passenger, collect fare, make change, etc.

The flag 495 of the taximeter still remains in the horizontal or "hired" position and also the rotary indicator on the roof of the taxicab still shows the word "Hired", as the taxicab is hired until the passenger has paid his fare and has been discharged.

After the passenger has paid his fare and left the taxicab, the driver gives the wing nut 462 another turn, thereby setting the flag 495 again in its vertical or "vacant" position, as shown in Figs. 14 and 22, and actuating the automatic control mechanism. When in this position, the mileage mechanism of the totalizer again totalizes both total and vacant mileage. The actuation of the automatic control sets the indicating and recording mechanisms of the taximeter in the non-operative position and, furthermore, as heretofore described, engages the conducting blade 259 with the spring contacts 283, 284, Figs. 8 and 19, hence completing the circuit of the magnet 21 of the rotary indicator, Figs. 2, 4 and 7, which causes the box 50 to rotate one-quarter of a revolution back to its original position. With the box 50 again in its original or starting position, the word "Vacant" will again appear in the openings 7, 8 of the rotary indicator which, together with the vertical or "vacant" position of the flag 495, will indicate to people interested that the taxicab is for hire. As in the "hired" and "cash" positions, the indicating and recording mechanisms of the taximeter and the rotary indicator are placed in the "vacant" position by the automatic control mechanism, thereby depriving the driver of any control whatsoever over the said taximeter or indicator which he could use for his personal gain.

The key switch 300, Figs. 8, 14, 21 and 22, by means of its conducting blade 312, controls the circuit of the bulbs 87, 94 of the rotary indicator (Figs. 3 and 8), thereby allowing the owner or operator of the taxicab, who possess the key for said key switch, to illuminate or extinguish said bulbs at will. In the rotary indicator these bulbs are usually not illuminated during the daytime, as said indicator can then be read without the aid of the bulbs. The circuit of said bulbs is also broken by turning the key switch when the taxicab is in the garage or in storage so as not to unnecessarily consume electric current. As the driver does not possess a key for the key switch, he can at no time control the circuit of the bulbs 87, 94 and therefore cannot tamper with the indicator in this respect.

*Operation of the modified form of indicator in conjunction with the taximeter.*

In Fig. 14, the taximeter 453 and the modified form of indicator are shown mounted on a taxicab. As shown, the taximeter indicates that the taxicab is vacant as the flag 445 is in its vertical or "vacant" position. Also, the indicator shows "Vacant" in its openings 132, 134, Figs. 9, 12 and 14. A passenger hires the taxicab and, as before, the driver, turns the wing nut 462 of the taximeter, Figs. 14, 21 and 22, thereby lowering the flag 495 to its horizontal or "hired" position, and actuating the automatic control mechanism. This actuation of the automatic control mechanism sets the indicating and recording mechanisms of the taximeter in their operative positions, and, also, as heretofore described, disengages the conducting blade 392, Figs. 15 and 23, from the spring contacts 395, 396, thereby breaking the circuit of the bulbs 160, 161, of the modified form of indicator, Fig. 11, the extinguishing them, hence causing the word "Vacant" to disappear from the openings 132, 134 of said indicator. At the same time, the conducting blade 391, Figs. 15 and 23, engages with the spring contacts 393, 394, thus closing the circuits of the bulbs 168, 169, Figs. 11 and 15, of the modified form of indicator and illuminating them, which, in turn, causes the word "Hired" to appear in the openings 133, 135, Figs. 12 and 14.

In placing the taximeter in the "cash" or temporary non-recording position so as to discharge the passenger, make change, etc., the driver again turns the wing nut 462 of said taximeter, Figs. 14, 21 and 22. During this operation, the automatic control mechanism is actuated but the flag 495 still remains in its "hired" or horizontal position. Said automatic control mechanism places the taximeter mechanism in its proper position but in no way causes the modified form of indicator to function and, therefore, said indicator will still show "Hired" from its openings 133, 135.

After the passenger has paid his fare and has been discharged, the taximeter is placed in its "vacant" position as shown in Figs. 14 and 22, by a further turning of the wing nut 462. The flag 495 is then replaced to its vertical or "vacant" position and the automatic control mechanism functions. The automatic control mechanism sets the indicating and recording mechanism of the taximeter in its non-operative position and also disengages the conducting blade 391, Figs. 15 and 23, from the spring contacts 393, 394, thereby breaking the circuit of the bulbs 168, 169, Figs. 11 and 15, of the modified form of indicator which extinguishes them and causes the word "Hired" to disappear from the openings 133, 135 of said indicator, Figs. 12 and 15. As the conducting blade 391 is disengaged, the conducting blade 392 is thrown into engagement with the spring contacts 395, 396, Figs. 15 and 23, thus closing the circuit of the bulbs 160, 161, thereby illuminating them, which again causes the word "Vacant" to appear in the openings 132, 134 of the modified form of indicator, Figs. 12 and 14.

As with the rotary indicator, the functioning of the modified form of indicator and the setting of the indicating and recording mechanism of the taximeter is governed by the automatic control mechanism and hence the driver cannot manipulate said indicator or taximeter for his own advantage. The mileage mechanism of the taximeter before described in conjunction with the rotary indicator operates in the same manner for this installation. The key switch 300, Figs. 14, 15, 21 and 22, also heretofore described, is used for the modified form of indicator in a manner similar to its use on the rotary indicator. In the modified form of indicator said key switch through its conducting blade 312 breaks the circuit of both the bulbs 160, 161 and 168, 169. In the case of the modified form of indicator, however, said circuit is only broken when the taxicab is in storage or the garage, as during both the night and day, the illumination of the bulbs 160, 161, and 168, 169 at the proper time is necessary for the proper operation of said indicator.

The simultaneous automatic operation of the fare register and the indicator fixed to the top of the taxicab must be clearly apparent and obvious from the foregoing description. A manipulation of the member 495 to a predetermined position will automatically set the mechanism on the back plate and take the control of the fare register out of the hands of the driver and at the same time make an electrical contact through the shaft connecting means with the indicator which will automatically and simultaneously indicate a condition corresponding to that indicated on the register.

In accordance with the provisions of the patent statute, we have described the principle of our invention together with the apparatus which we now consider to represent the best embodiment thereof, but we desire it understood that our invention is not confined to the particular form of apparatus herein shown and described, the same being merely illustrative, and that the invention can be carried out in other ways without departing from the spirit of our invention, and, therefore, we claim broadly the right to employ all equivalent instrumentalities coming within the scope of the appended claims, and by means of which the objects of our invention are attained, and the new results accomplished, as herein set forth, as it is obvious that the particular embodiments herein shown and described are only some of many that can be employed to attain these objects and accomplish these results.

Having described our invention, what we claim and desire to secure by Letters Patent is:

1. In a device of the character described, motor driven fare registering mechanism, a visual indicator adjacent said fare registering mechanism, a second visual indicator remote from said fare registering mechanism and said first mentioned indicator, means for initiating operative connection of said fare registering means to its motor means simultaneously with the initiation of variation of the first mentioned indicator, means to complete the operative connection of said fare registering mechanism independently of the completion of variation of said first mentioned indicator, and means controlled by said last mentioned means to control the operation of said second visual indicator.

2. In a device of the character described, motor driven fare registering mechanism, a mechanically operated visual indicator adjacent said fare registering mechanism, an electrically operated visual indicator remote from said fare registering mechanism and said mechanically operated indicator, means for initiating operative connection of said fare registering means to its motor means simultaneously with the initiation of variation of said mechanically operated visual indicator, means to complete the operative connection of said fare registering mechanism independently of completion of variation of said mechanically operated visual indicator, and a circuit controlling device for said electrically operated indicator controlled by said last mentioned means.

3. In a device of the character described, motor driven fare registering mechanism, an indicator flag adjacent said fare registering mechanism, an electrically operated plural variation signal remote from said fare registering mechanism, a manually operated shaft, rotation of which initiates operative connection of said fare registering mechanism to its motor means and produces movement of said indicator flag, and an escapement put in operation by rotation of said shaft, said escapement when put in operation completing connection of said fare registering mechanism and variation of said signal independent of the checking or reversal of said shaft.

4. In a device of the character described, motor driven fare registering mechanism, an indicator flag adjacent said fare registering mechanism, an electrically operated, two variation, visual signal remote from said fare registering mechanism, a manually operated shaft rotation of which produces movement of said indicator flag and first winds up and then releases the spring of a spring escapement, said spring when released driving shafts actuating the connection of said fare registering mechanism to its motor means and actuating circuit controlling means for said signal independent of checking or reversal of movement of said manually operated shaft.

This specification signed this 27th day of October, 1923.

CHARLES A. FAUSEL.
HARRY E. BAUER.